Feb. 9, 1932.   B. T. HEADLEY ET AL   1,844,549
GLASS WORKING MACHINE
Filed Sept. 28, 1927   18 Sheets-Sheet 14

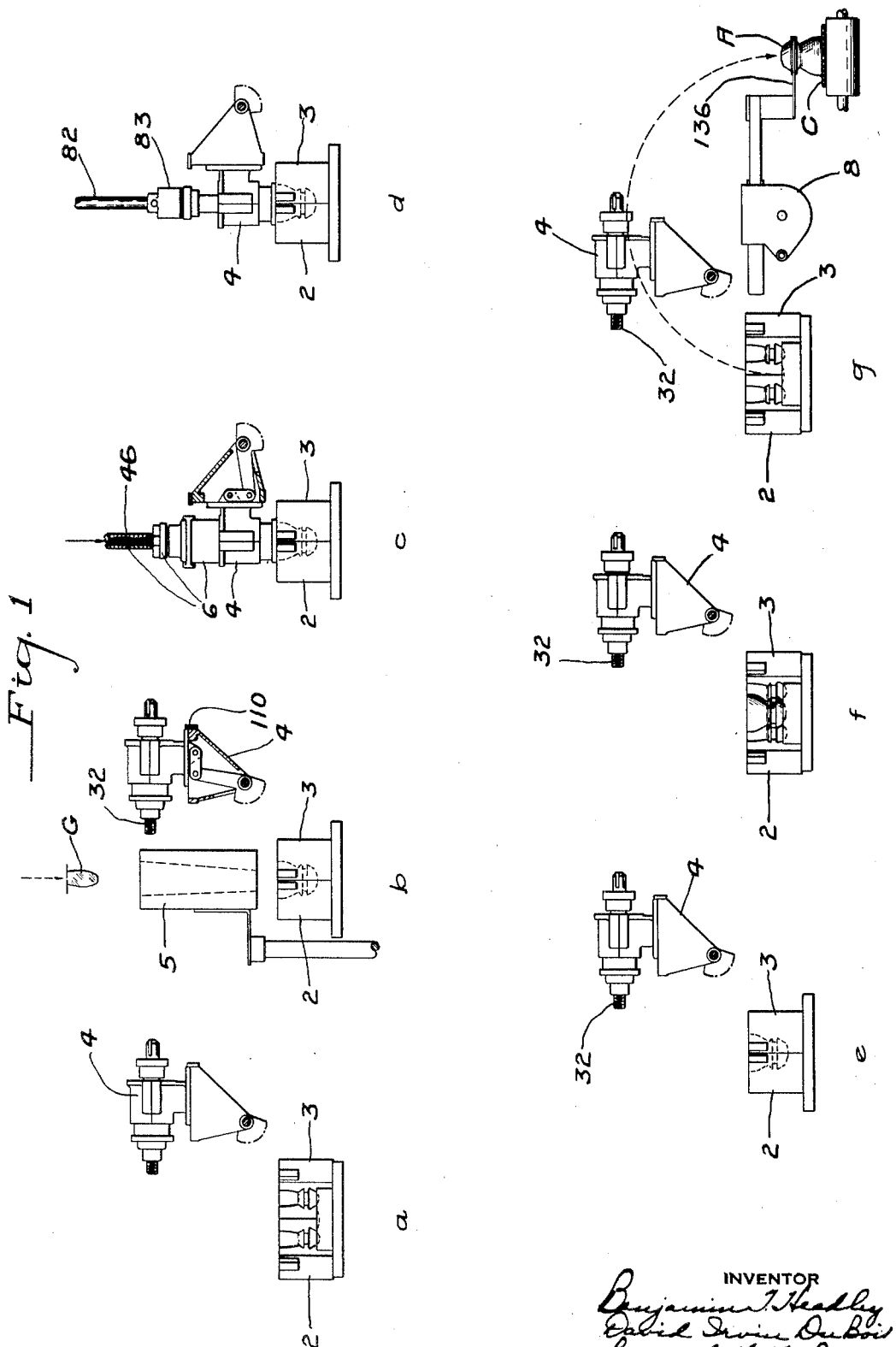

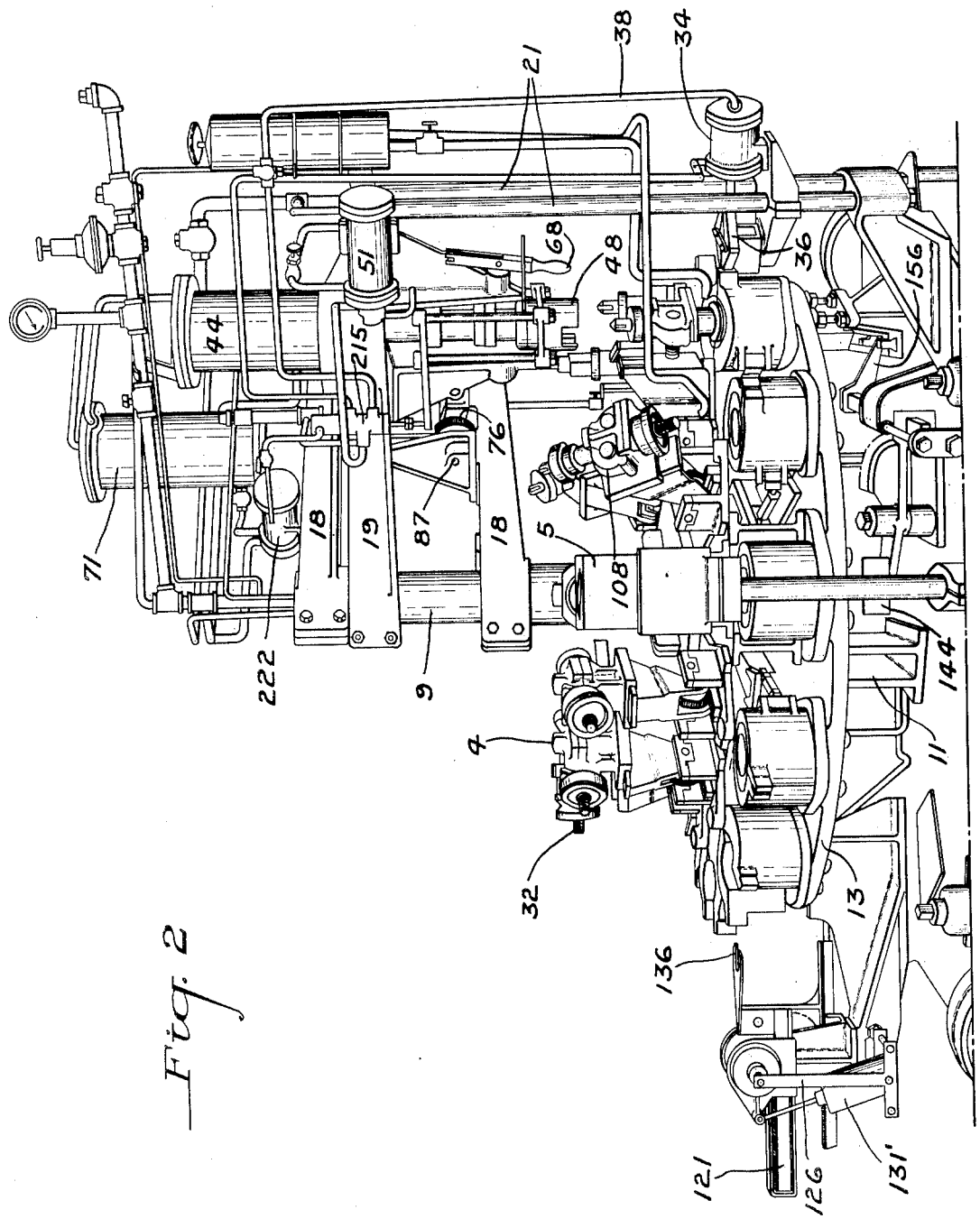

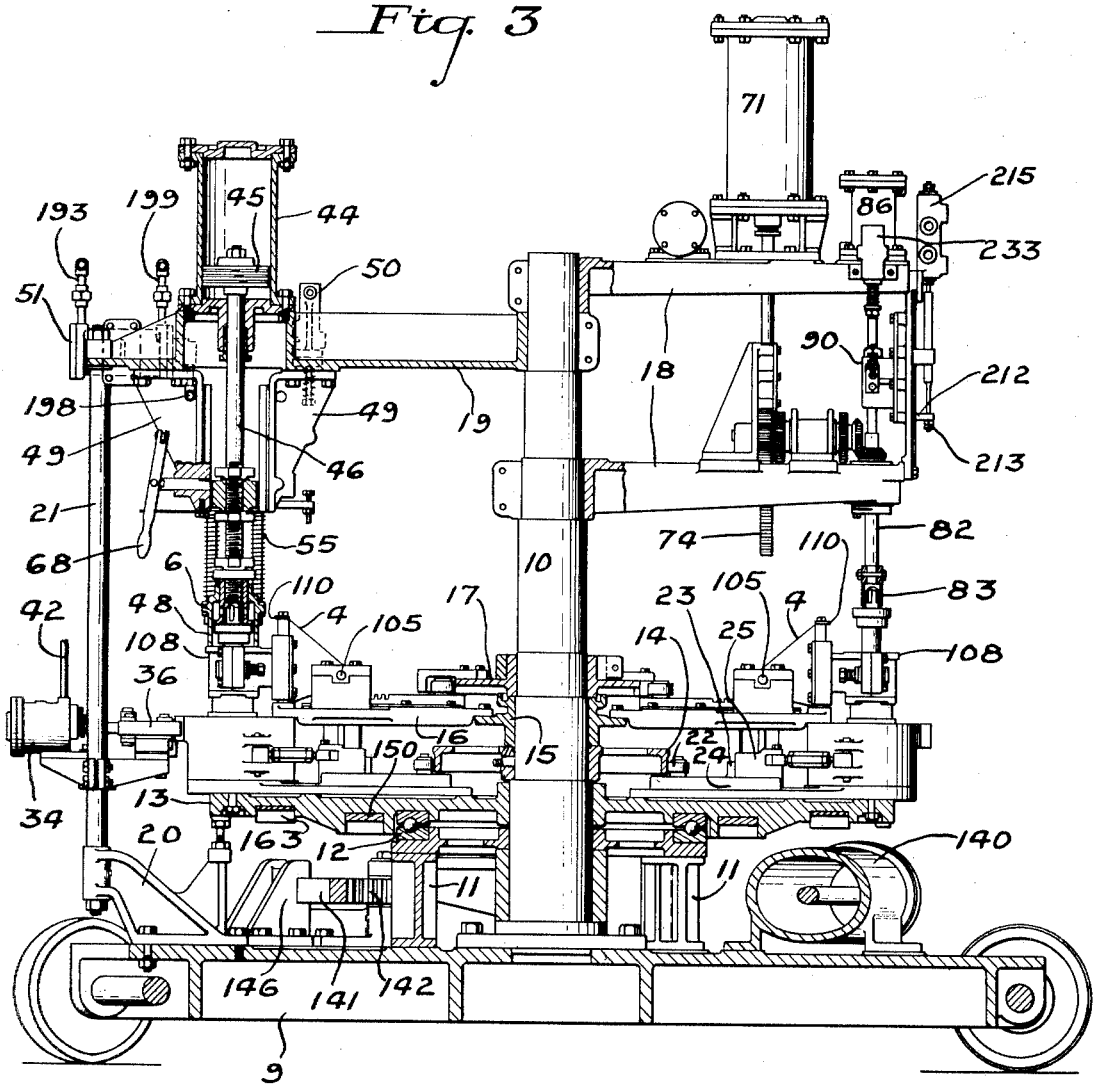
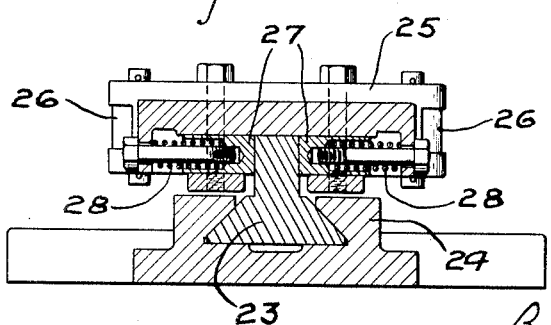

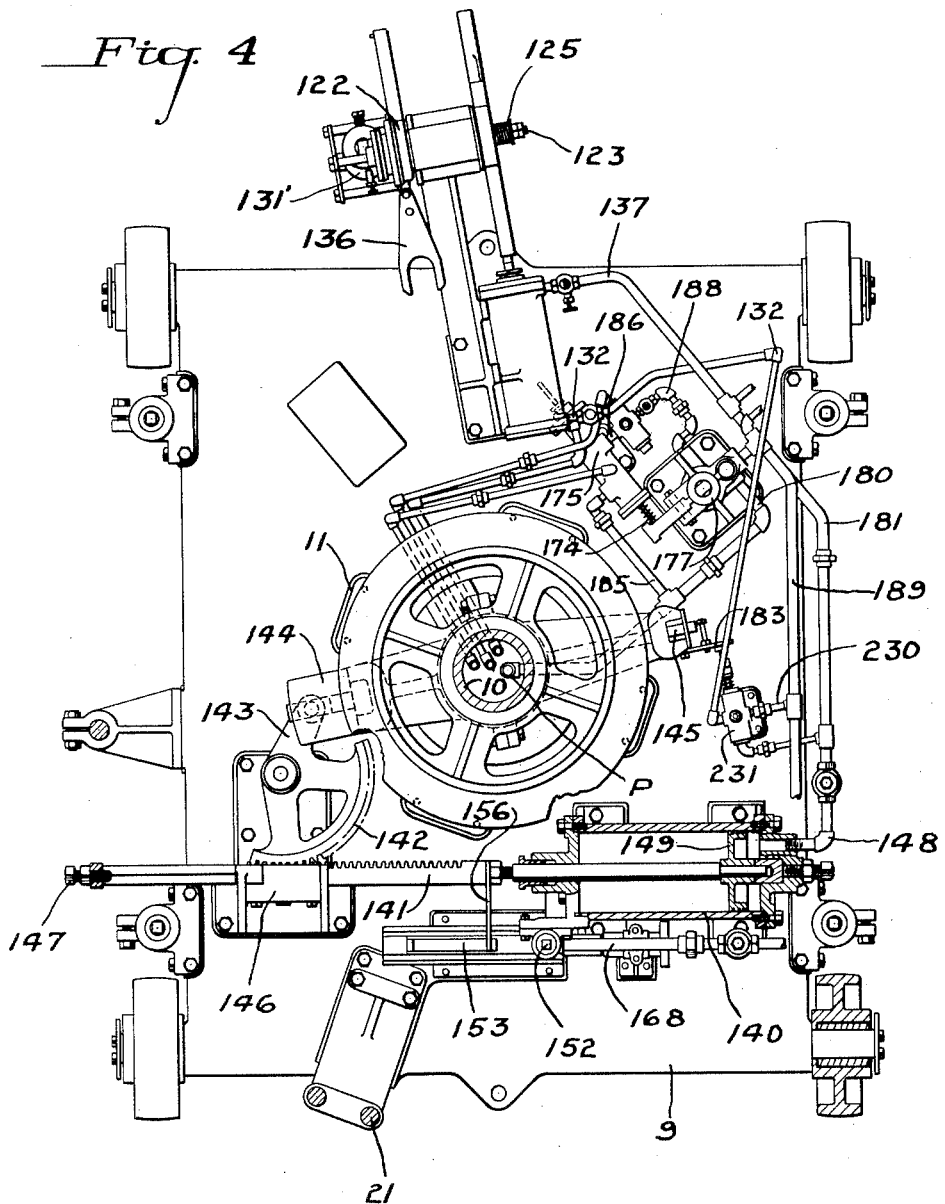

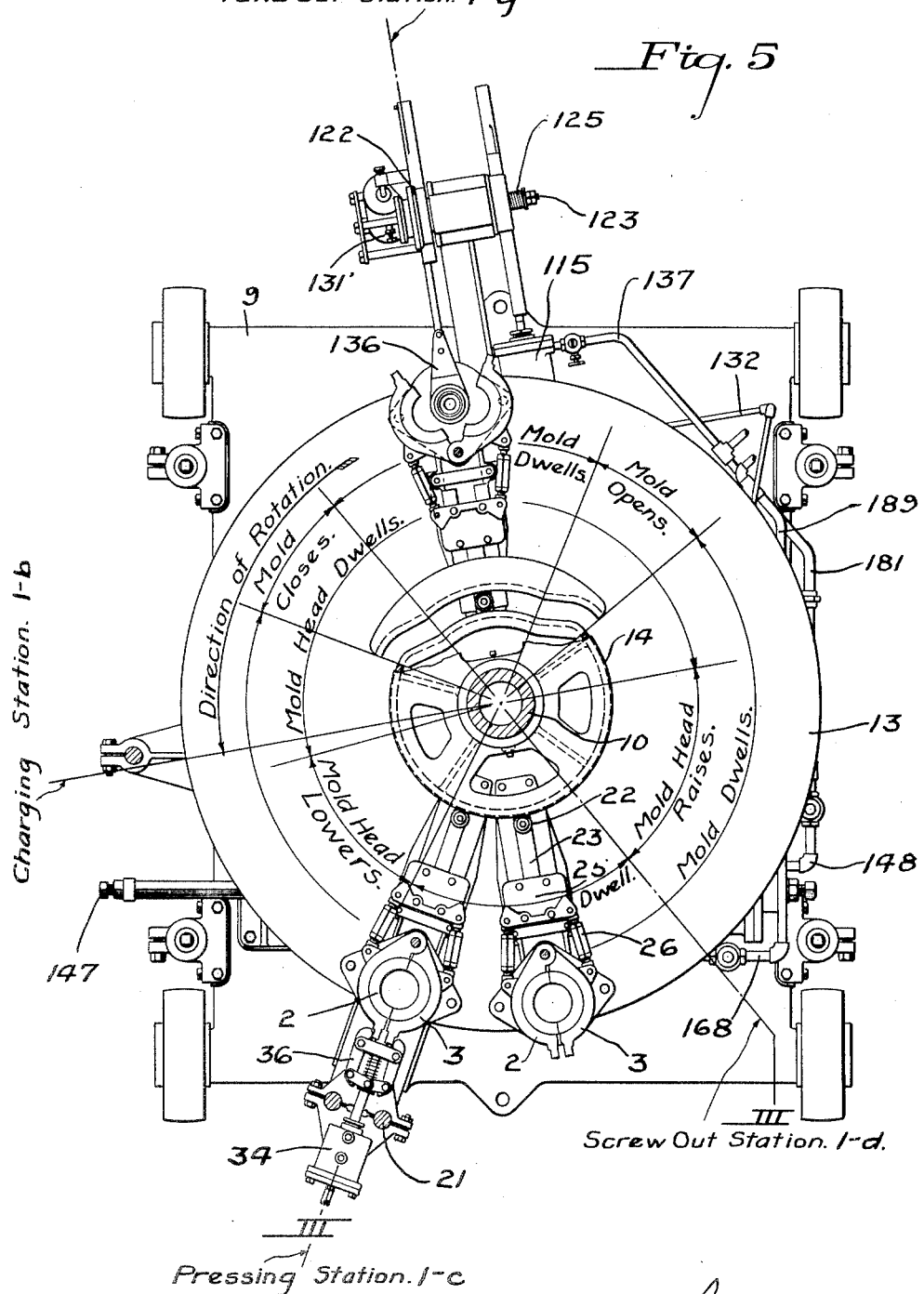

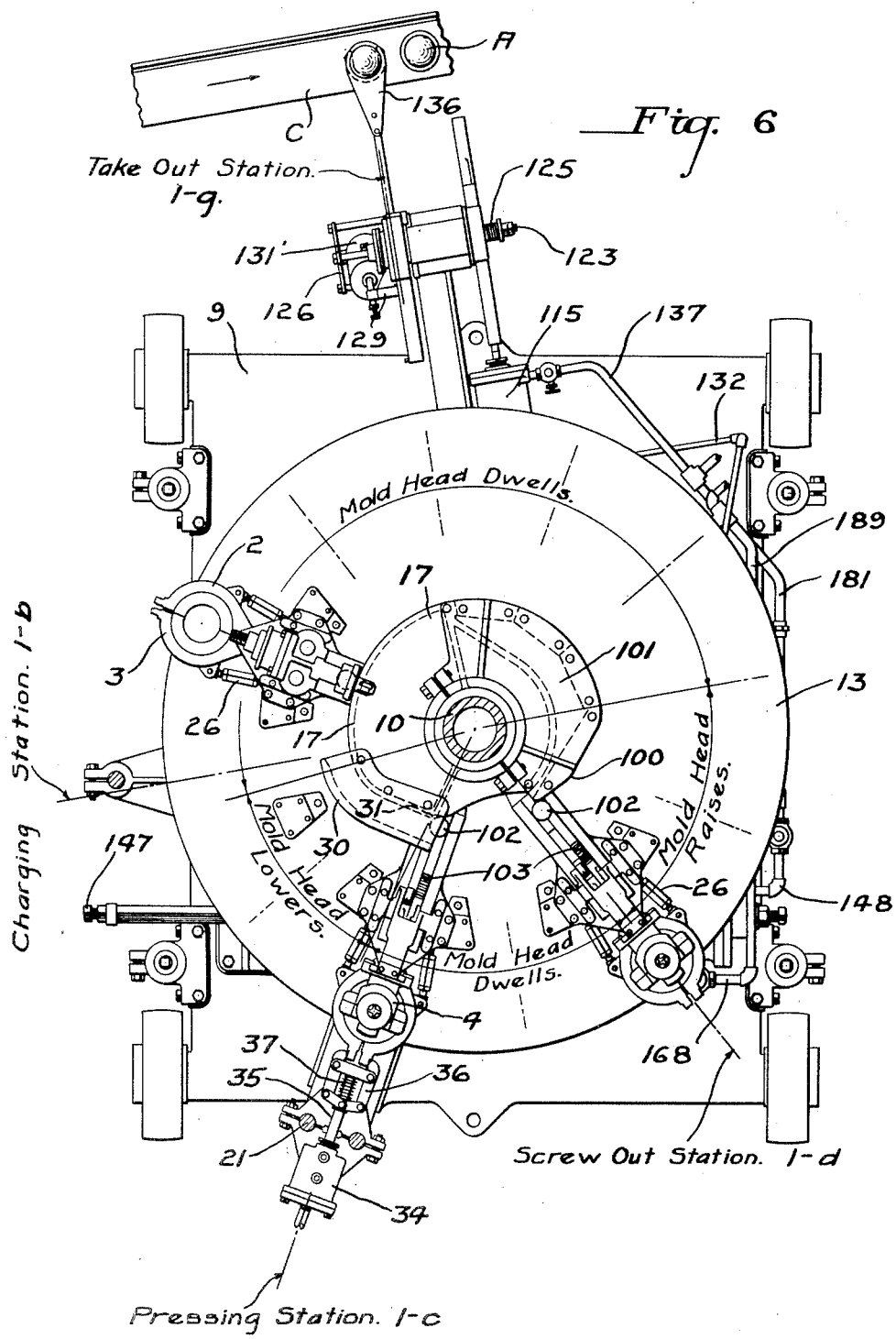

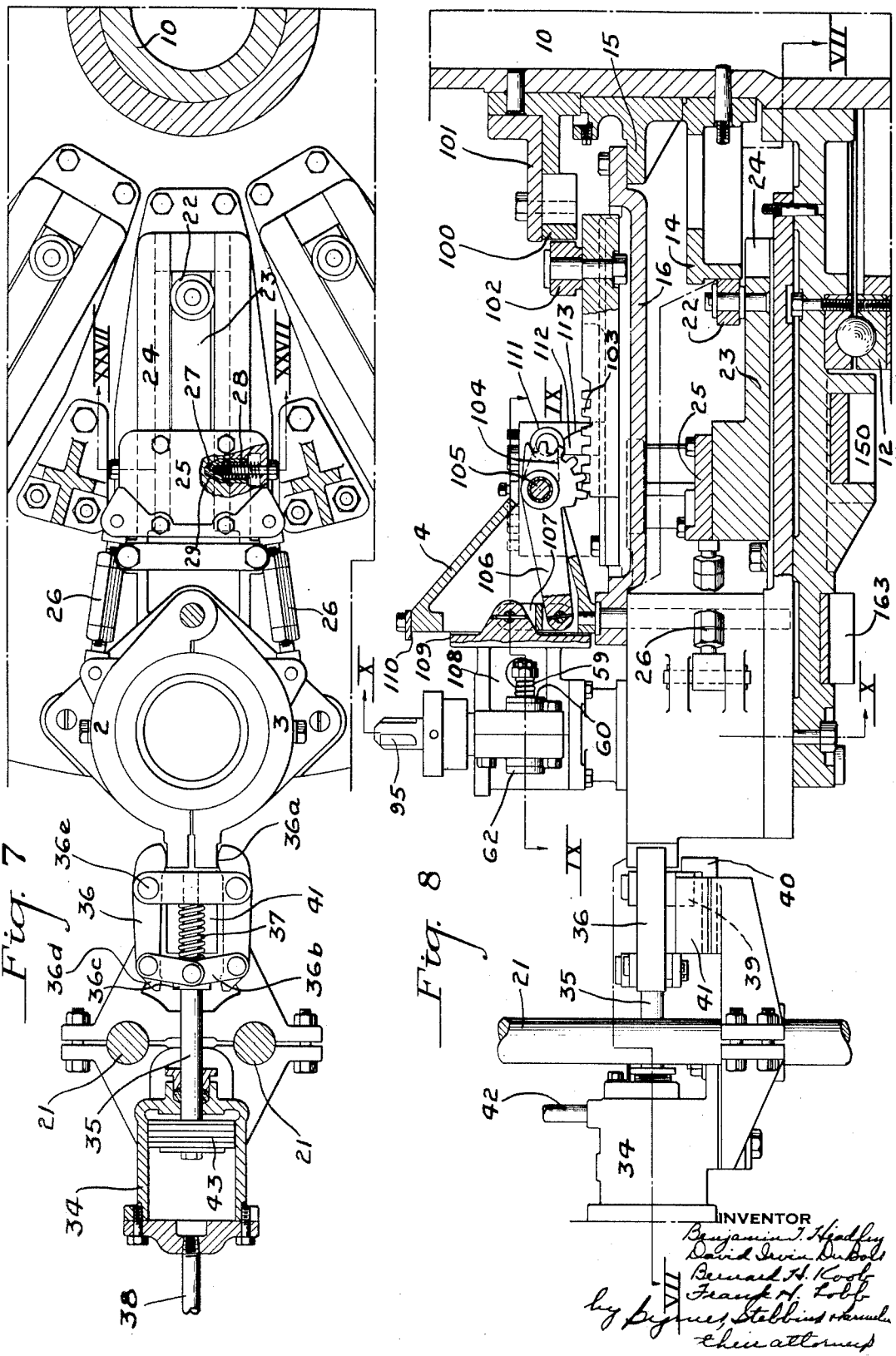

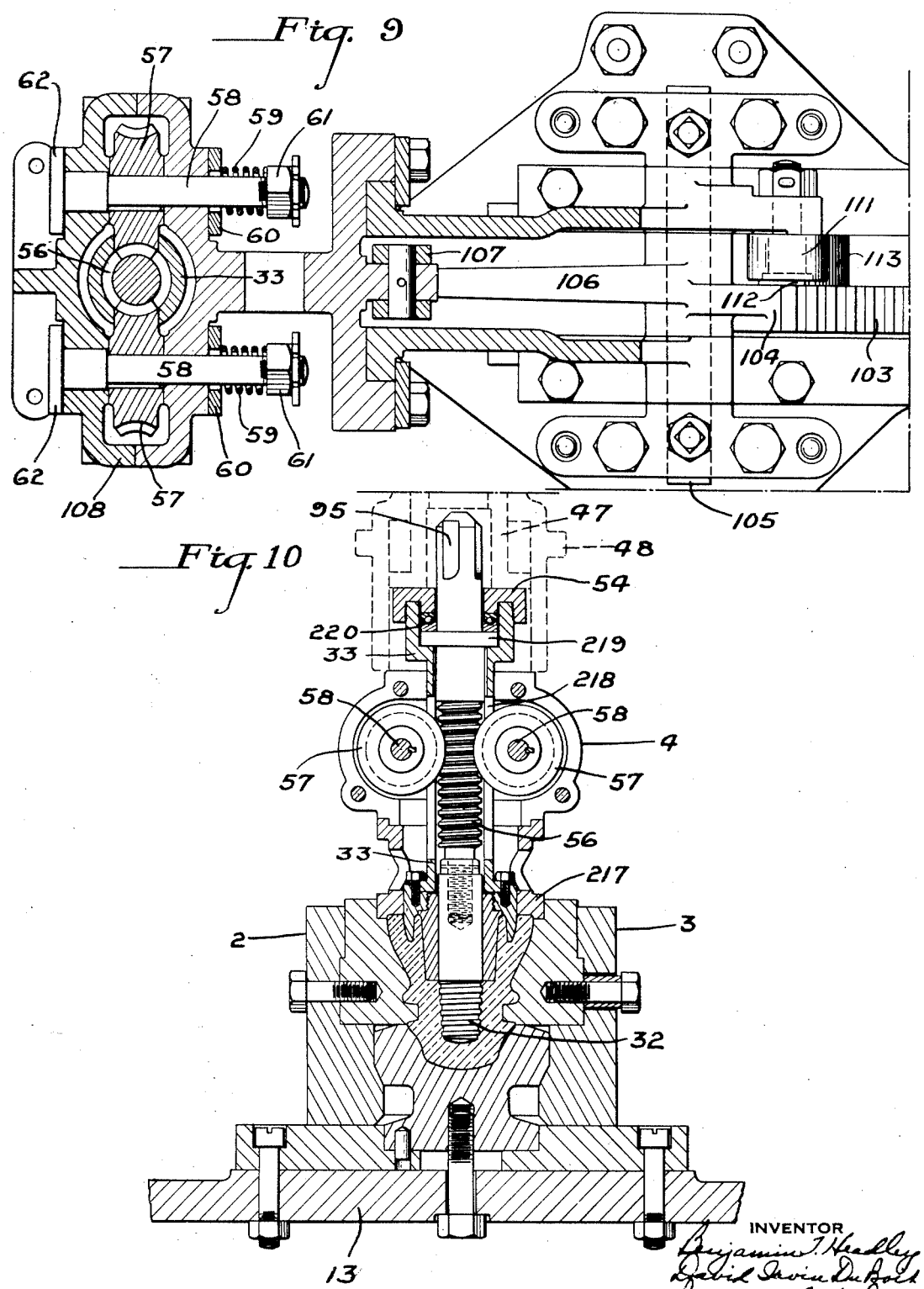

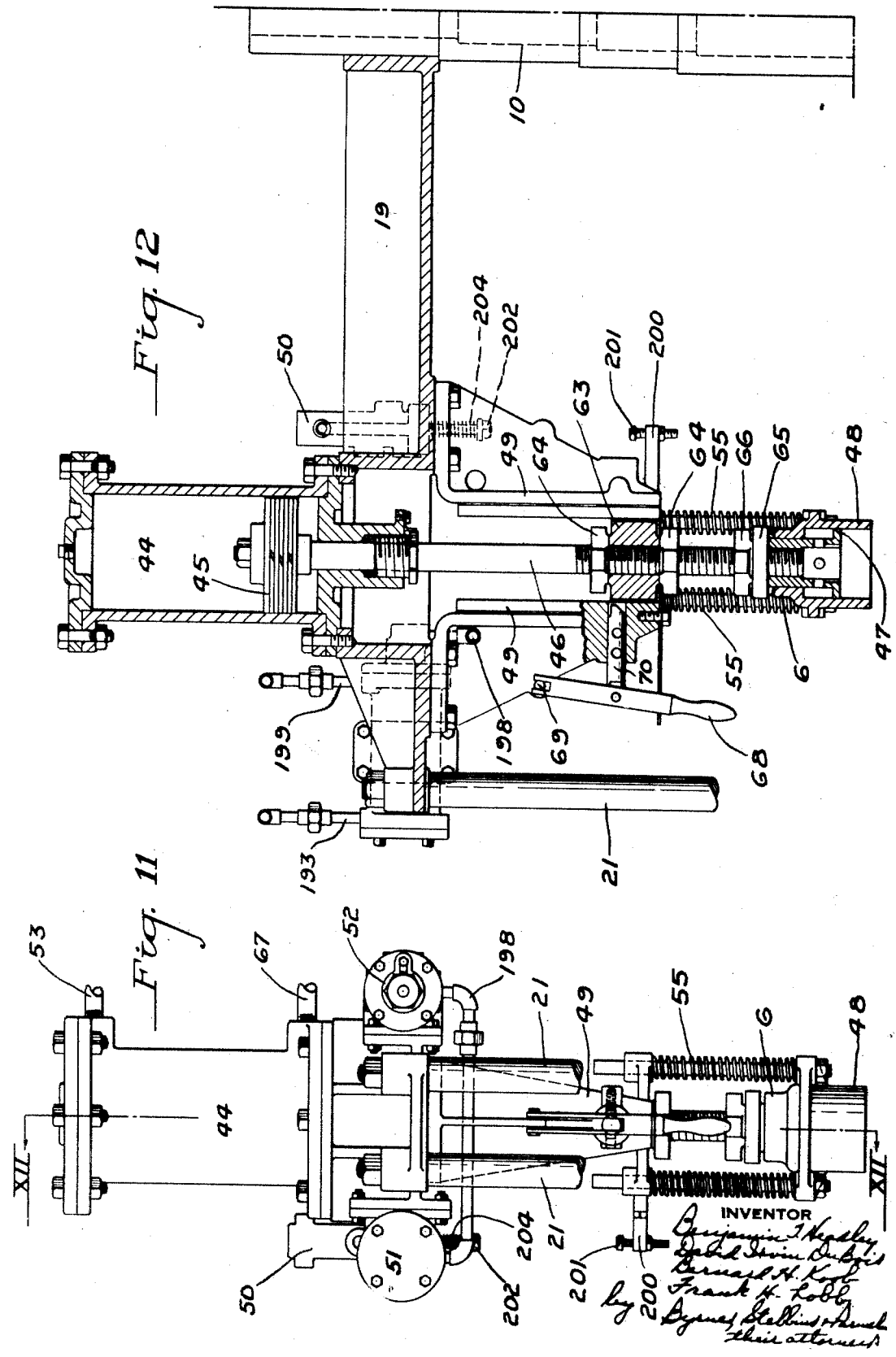

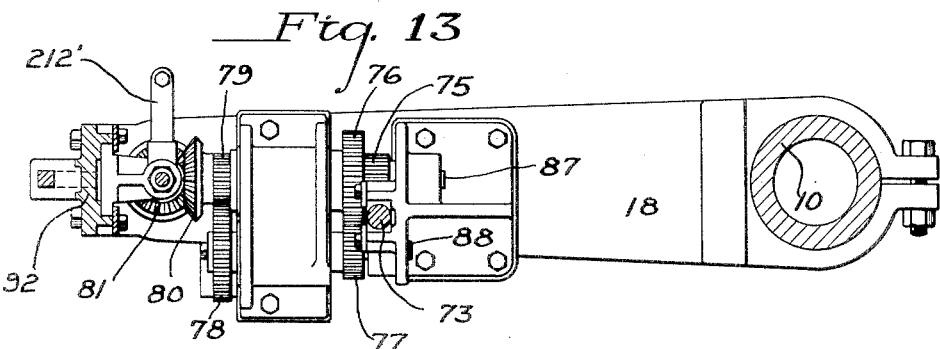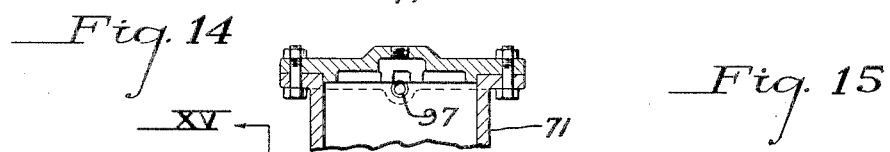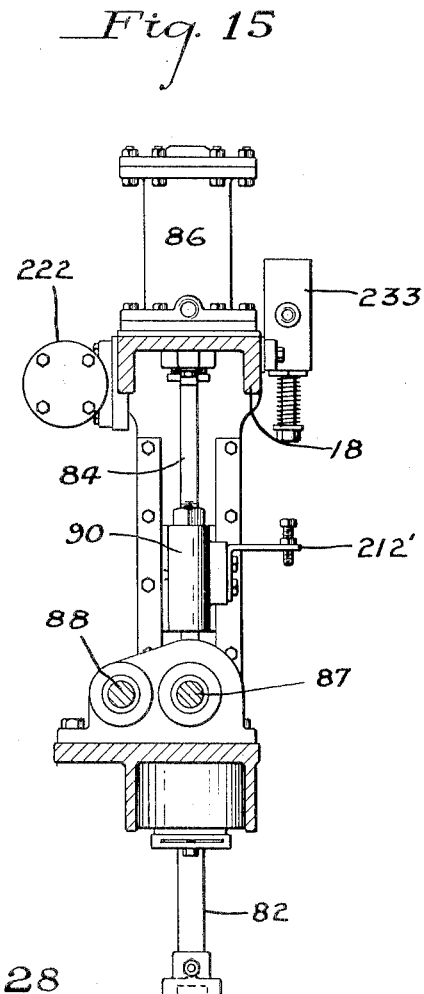

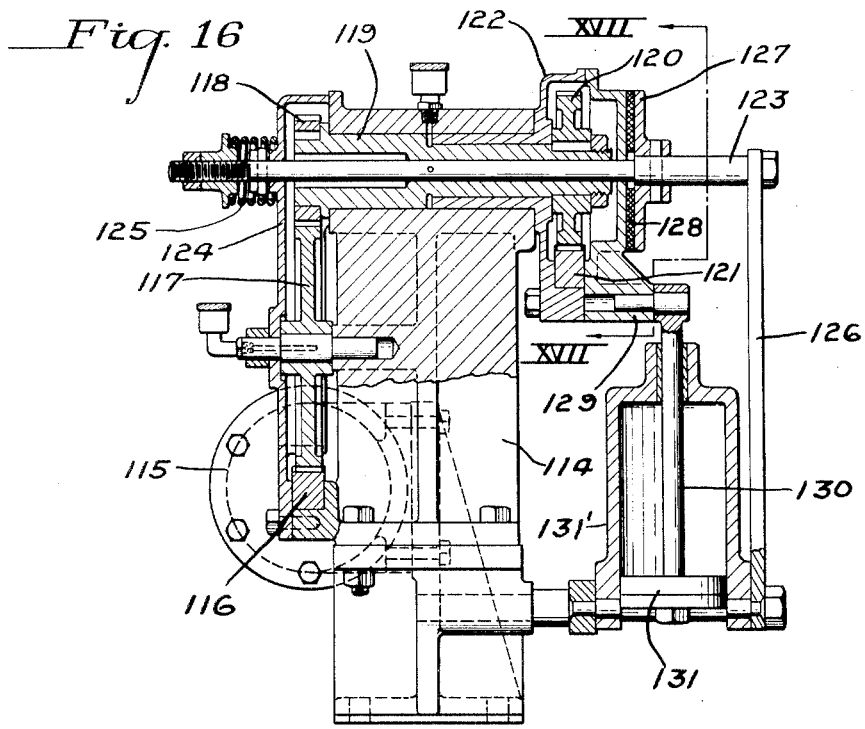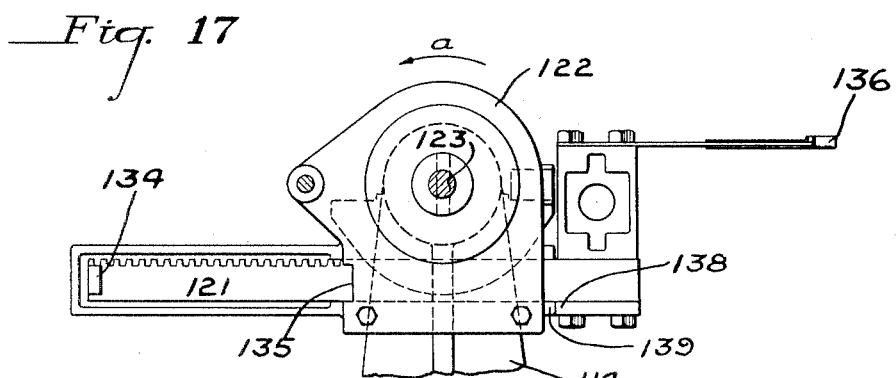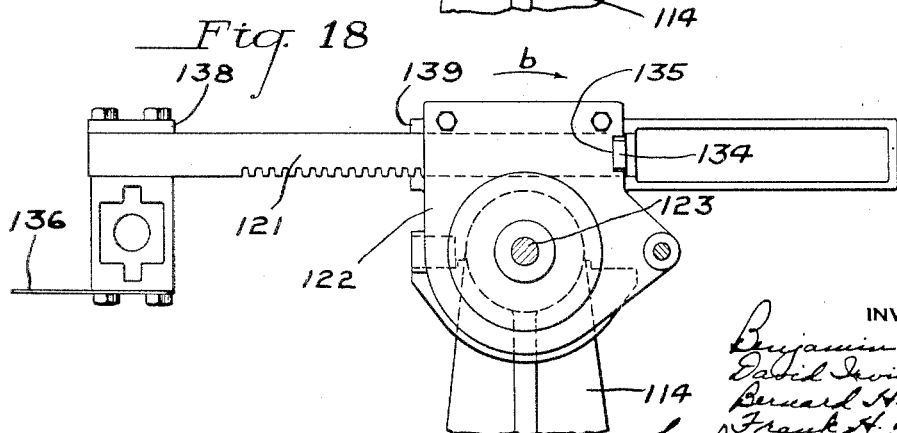

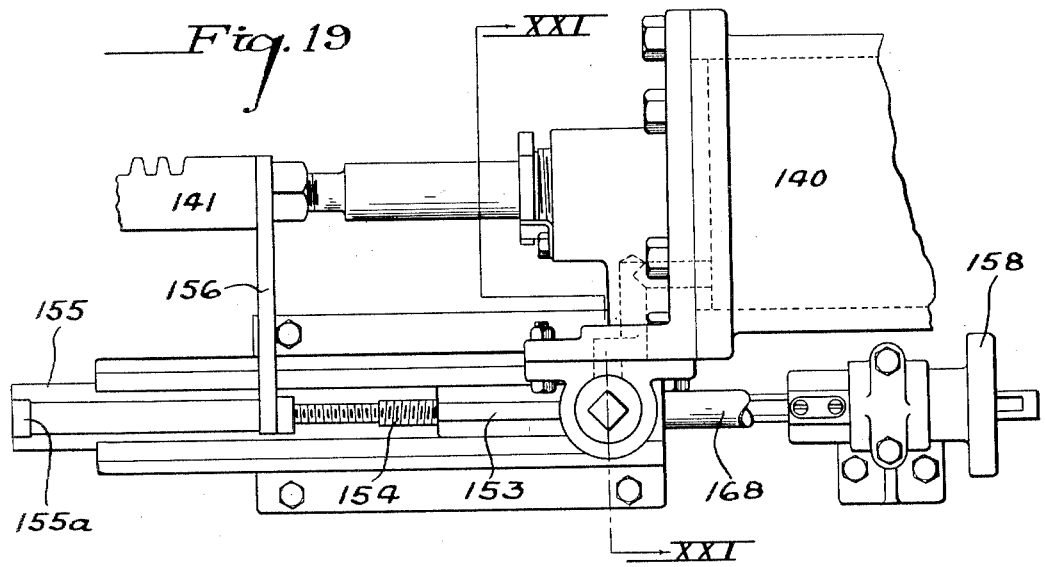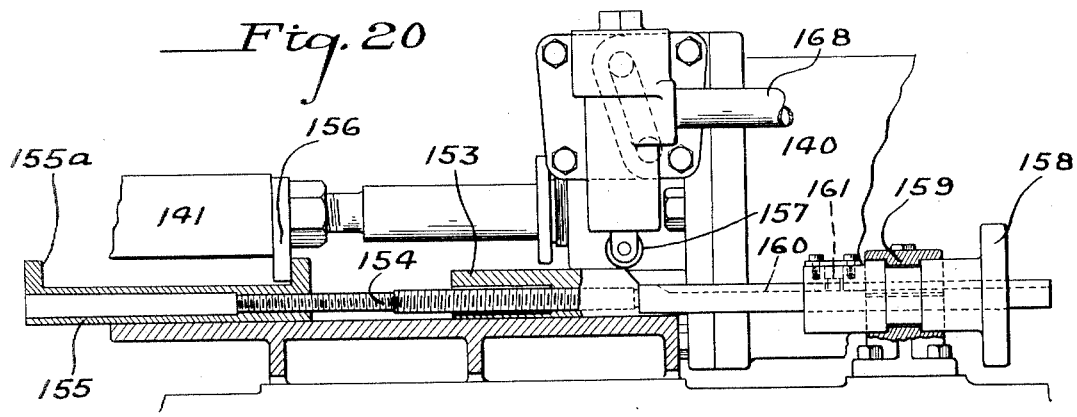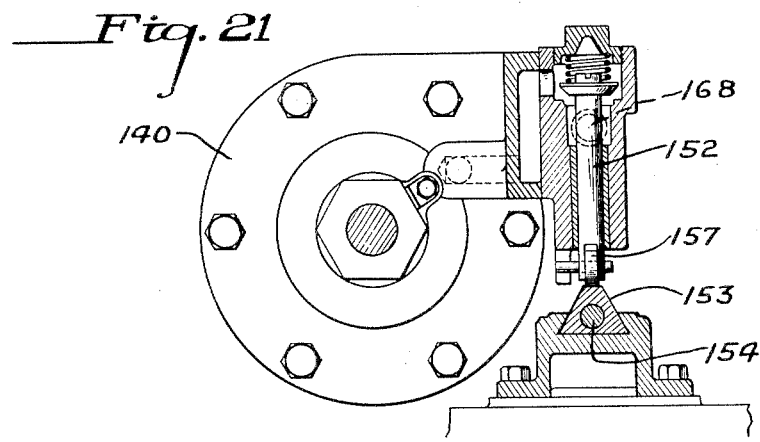

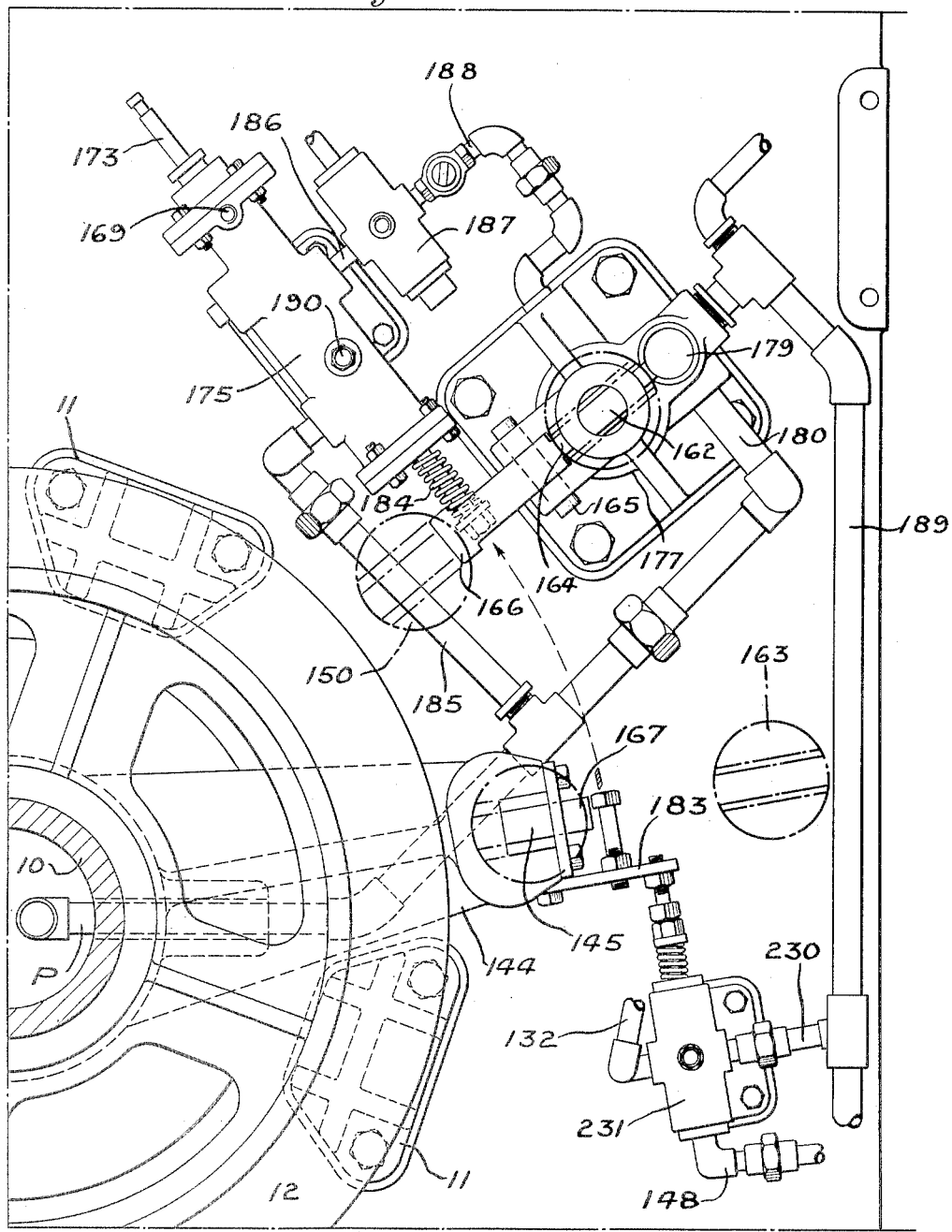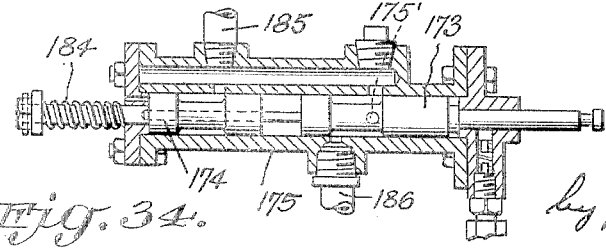

Feb. 9, 1932. B. T. HEADLEY ET AL 1,844,549
GLASS WORKING MACHINE
Filed Sept. 28, 1927 18 Sheets-Sheet 17

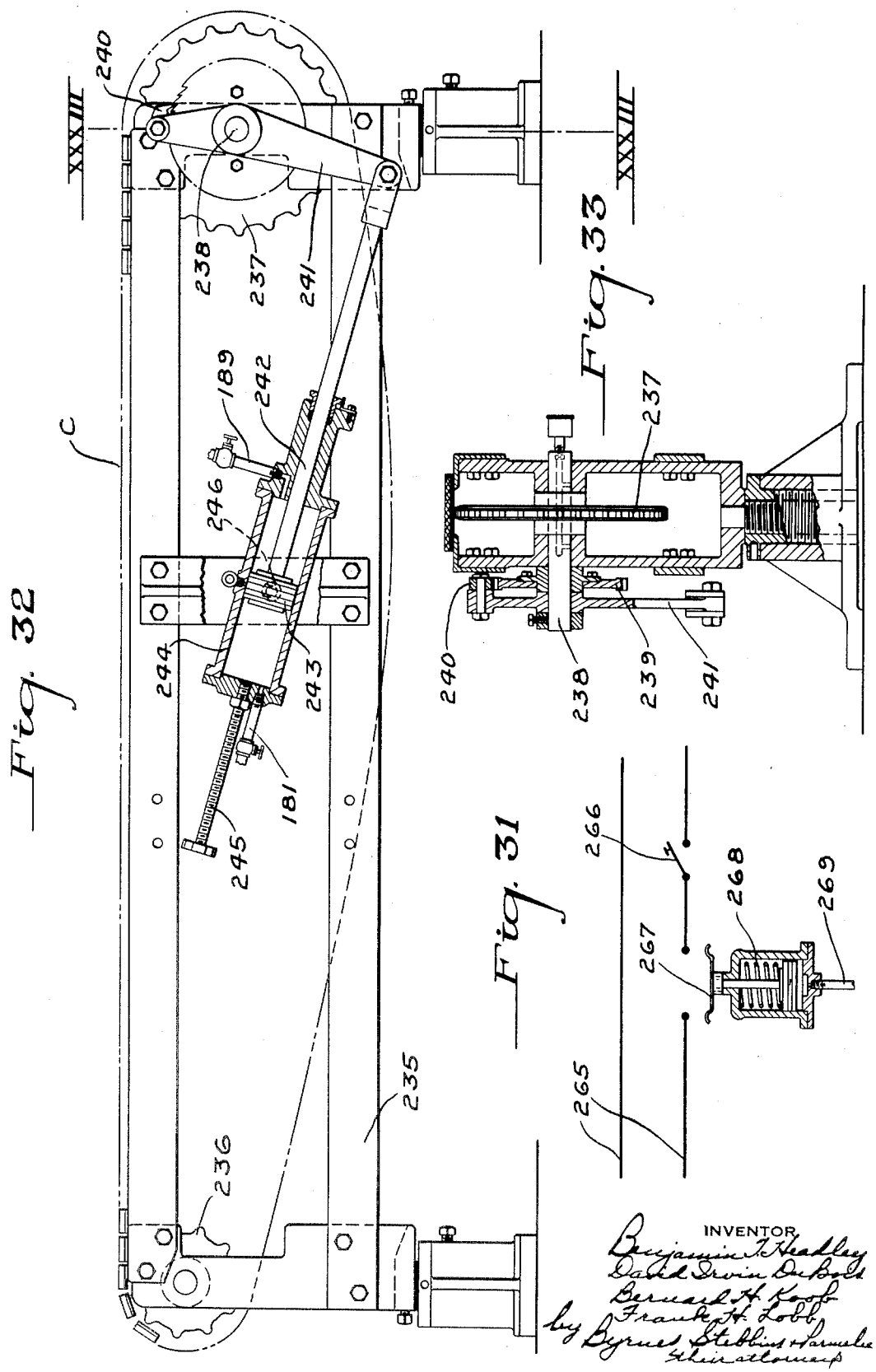

Patented Feb. 9, 1932

1,844,549

UNITED STATES PATENT OFFICE

BENJAMIN T. HEADLEY, DAVID IRVIN DU BOIS, AND BERNARD H. KOOB, OF MILLVILLE, NEW JERSEY, AND FRANK H. LOBB, OF RIDLEY PARK, PENNSYLVANIA, ASSIGNORS TO WHITALL-TATUM COMPANY, OF MILLVILLE, NEW JERSEY, A CORPORATION OF NEW JERSEY

GLASS WORKING MACHINE

Application filed September 28, 1927. Serial No. 222,461.

The present invention relates broadly to the art of glass working machines, and more particularly to machines of the character contemplated for the production of so-called wide mouthed or pressed ware as distinguished from narrow neck ware or paste mold ware. More especially, the invention is directed toward the production of a pressed article, such, for example, as an insulator, in which it is desirable to produce a portion or portions having threads thereon.

The invention contemplates the provision of a machine comprising a plurality of molds movable successively to different stations, the term "station" being hereinafter used in its generic sense as definitive either of a fixed position such as ordinarily obtains in a machine of the intermittently operable type, or a station of greater or less extent in which a certain operation takes place while the machine is moving, as in the case of a continuously rotating machine.

Specifically, the invention contemplates a movable mold carrier having a plurality of molds of similar construction thereon, which molds are adapted to pass successively to a charging station at which a gather of glass is delivered thereto in any desired manner. Thereafter the operation of the machine brings the charged mold to a pressing station, at which station the glass is subjected to a pressing and forming operation under the influence of a press head and press plunger, preferably including a screw-out peg. The continued operation of the machine is then effective for carrying the mold with the pressed and formed article therein to a plunger removal station, or screw-out station, at which the plunger or screw-out peg is moved out of cooperative relation to the glass. Further operation of the machine brings the mold with the formed article to a take-out station at which the formed article is removed from the mold.

However, the invention is not limited in its broader aspects to the details of construction herein shown, or to the relationship of the parts described, but is preferably embodied in an intermittently moving machine having a plurality of molds of identical construction, each mold having its individual glass forming elements cooperating therewith, whereby the complete machine embodies, in effect, a plurality of units, each of which units is operable for the complete formation of a finished article. The units are combined in such manner that the machine may be expeditiously operated at a speed to give quantity production under conditions such that an article when removed from the mold is cooled and set to such an extent as to be inherently self-supporting.

In the accompanying drawings we have shown, for purposes of illustration only and not by way of limitation, a preferred embodiment of the present invention, it being understood that changes in the construction, character and relation of the parts, as well as in the manner of operation thereof, may be made without departing either from the spirit of the present invention or the scope of our broader claims.

In the drawings,—

Figure 1 is a diagrammatic drawing showing the different steps designated by letters $a$ to $g$—the complete cycle of making a glass insulator;

Figure 2 is a side elevation of the assembled machine looking at it from the side of the charging station;

Figure 3 is a partial section on the line III—III of Figure 5;

Figure 4 is a sectional plan view of the base taken under the ball race;

Figure 5 is a sectional plan view taken above the mold opening and closing cam;

Figure 6 is a sectional plan view taken above the mold head raising and lowering cam;

Figure 7 is a view taken on line VII—VII of Figure 8;

Figure 8 is a side elevation of Figure 7, partially in section, but showing the mold head in pressing position over the mold;

Figure 9 is a section taken on the line IX—IX of Figure 8;

Figure 10 is a section taken on the line X—X of Figure 8;

Figure 11 is a front elevation of the pressing head mechanism;

Figure 12 is a section through the press head mechanism taken on line XII—XII of Figure 11;

Figure 13 is a sectional plan view of screw-out mechanism taken on line XIII—XIII of Figure 14;

Figure 14 is a sectional view of the screw-out mechanism;

Figure 15 is a section taken on the line XV—XV of Figure 14;

Figure 16 is a view, partly in section, of the take-out;

Figure 17 is a view taken on the line XVII—XVII of Figure 16 showing take-out finger at position before moving into the mold;

Figure 18 is a view similar to Figure 17 but take-out finger and accompanying parts are in the position of depositing the insulator on a conveyor;

Figure 19 is a plan view of the table rotating cushioning mechanism;

Figure 20 is a side elevation, partly in section, of Figure 19;

Figure 21 is a section taken on the line XXI—XXI of Figure 19;

Figure 22 is an enlarged portion of the base showing indexing valve and mechanism pertaining thereto;

Figure 24 is a view showing gob cutting shears in section and a plan view of the shear and machine timing and control mechanism;

Figure 25 is complete piping diagram of the machine;

Figures 29, 30 and 31 are detail views, partly in section and partly broken away, illustrating a modified form of screw-out mechanism;

Figures 32 and 33 are detail views of one form of conveyor mechanism; and,

Figure 34 is a longitudinal sectional detail view of the primary air valve.

Figure 23:
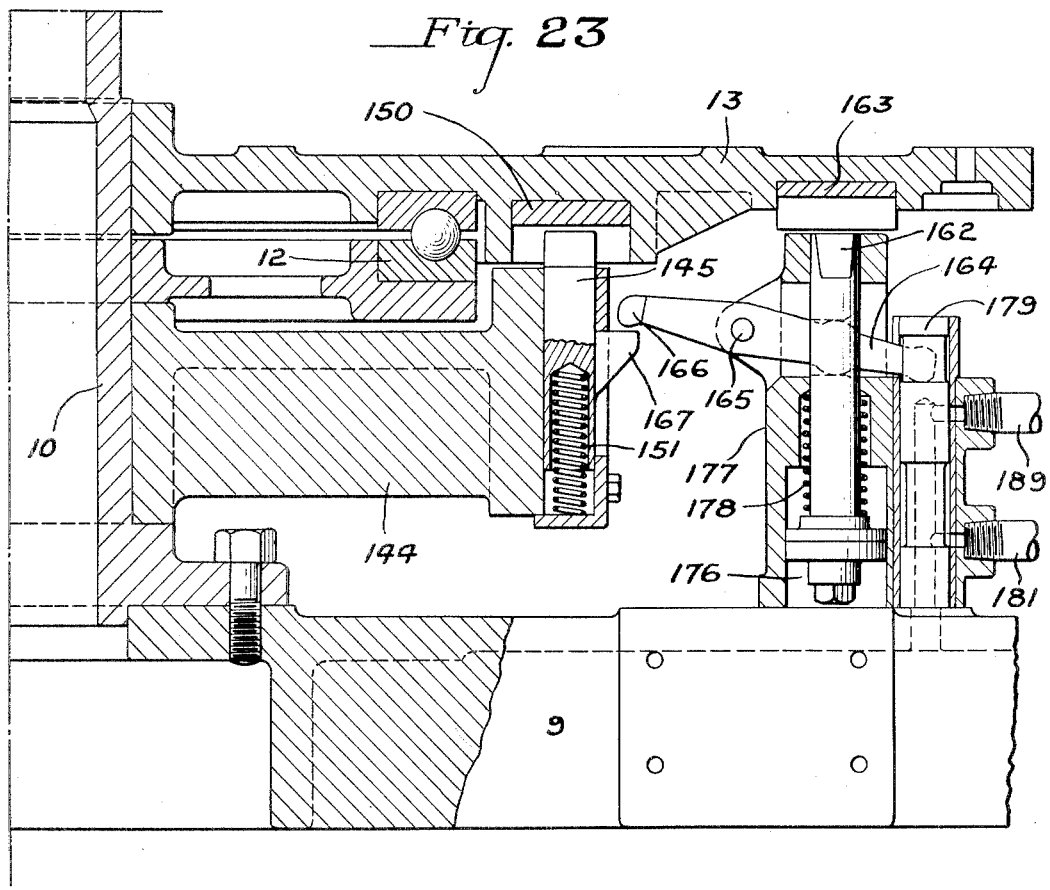
Figure 23 is a cross-section through indexing lever and indexing valve.
Figure 26:
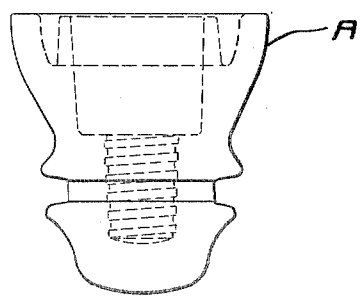
Figure 26 is a side elevation of a finished insulator.

For a general understanding of the present invention, reference may first be had to Figures 1 and 5 of the drawings, Figure 5 showing, in plan view with appropriate labels, the successive movements of certain portions of the apparatus, and Figure 1 showing diagrammatically a mold with its cooperating forming element in successive positions, the figure concluding with an illustration of one means of effecting in an automatic manner the removal of a formed article.

By reference to Figure 5 of the drawings, it will be noted that each of the molds comprises relatively movable sections 2 and 3 adapted to be moved into closed position to provide a forming cavity therein, and to open position to permit removal of a finished article. In Figure 1$^a$ the mold sections are shown open, and a forming element comprising a mold head 4 is illustrated in raised position. This figure illustrates the relative position of the parts of a mold which has just passed the take-out station where a finished article has been removed therefrom. Each mold head assembly includes a combined pressing and forming plunger, preferably in the form of a screw-out peg, adapted to form the internal threads on the article, as hereinafter more fully described.

In Figure 1$^b$ the parts are shown in the relative position which they occupy at the charging station. At this station a feeding or pouring guide 5 is in cooperative relation with the mold sections which at this time are closed to provide the desired forming cavity. A suitable gather or charge of glass G supplied by a punty or feeder is shown in position to drop through the guide 5 into the mold cavity, the mold head 4 still occupying its raised position.

In Figure 1$^c$ the parts are shown in the relative position which they occupy at the pressing station, the mold head being in cooperative engagement with the mold sections, and a press head 6 being shown in lowered position in engagement with the mold head.

In Figure 1$^d$ the parts are illustrated in the position which they occupy at the plunger removal or screw-out station, a plunger or peg screw-out shaft being illustrated in cooperative relation with the mold head, while Figures 1$^e$, 1$^f$ and 1$^g$ show succeeding positions of the parts terminating with them at the take-out station.

In Figure 1$^g$ a take-out mechanism 8 effective for engaging a finished article A in the mold, removing it therefrom and inverting it to a suitable offtake conveyor C, is shown.

As shown in Figure 3, the machine generally comprises a base 9 having mounted thereon a center column 10. Pedestals 11 carried by the base support a ball race 12. A mold table 13 rotates on the ball race and around the center column 10. Immediately above the mold table 13 and secured to the center column 10 is a mold opening and closing cam 14. A ring 15 is rotatably mounted on the column 10 and supports radial mold head supporting arms 16. A mold head raising and lowering cam 17 is secured to the column above the ring 15. Still further up on the center column 10 is a pair of spaced supports 18 and a single intermediate support 19. The supports 18 are for the plunger removal or screw-out mechanism, while the support 19 is for the press head. The press head is additionally supported from a bracket 20 on the base 9 by uprights 21 extending therefrom.

The drawings of the machine show twelve molds and twelve forming units. In the description we will use but one unit, all the units being alike.

After leaving the take-out station, the mold sections are closed by means of cam 14 working through roller 22 on slide 23. The slide, as shown in Figure 7, is guided on mold base 24 and is effective through slide head 25 and links 26 connected to the mold sections.

Figure 27:
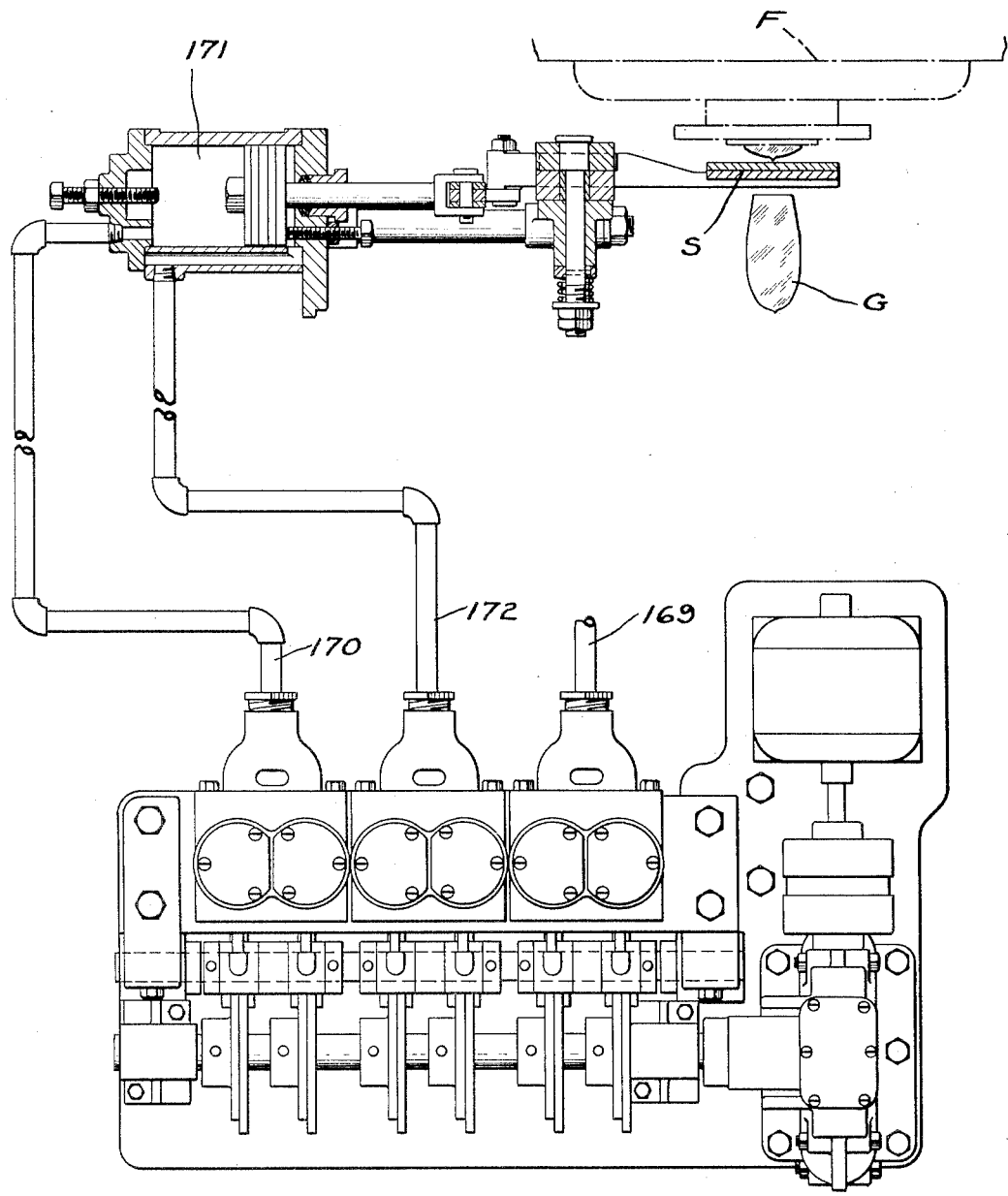
Figure 27 is a section on line XXVII—XXVII of Figure 7.

As shown in Figure 27, (at the bottom of Figure 3) a safety feature in the form of spring-actuated pawls 27 is provided in slide head 25, the reason for this being that a glass insulator breaking in the mold will jam the mold open. In such case safety pawls 27 allow slide 23 to move as actuated by cam 14 without closing the mold sections. If the mold casing were held open by broken glass and cam 14 were to actuate slide 23 to positively close the mold sections, the mechanism would jam if no release were provided. The safety feature takes care of this possible condition by permitting the slide head 25 to move relatively to the slide 23 while the latter is moved by the cam 14. The slide 23 and slide head 25 are yieldably connected by pawls 27, and since these pawls are held in position by springs 28, Figure 7, they can be forced back out of grooves 29, thus allowing slide 23 to move relatively to the slide head 25 without closing the mold.

After the mold is closed, it is rotated about the center column in intermittent steps by means hereinafter described.

Arriving at the charging station the mold dwells for a suitable period of time while it is charged with a gather of molten glass delivered thereto through the pouring guide 5 as shown in Figure 1$^b$. Upon leaving the charging station the mold head is gradually lowered by cam plate 30 (Figure 6) bolted to cam 17. This gradual lowering continues until the head reaches a point opposite an offset 31 in cam 17. Up to this time the plunger or screw-peg 32 (Figure 10), carried in the mold head 4, has not been lowered into the molten glass. The offset 31 allows the mold head 4 to be quickly lowered into engagement with the mold just preceding the pressing operation, so the glass is not prematurely cooled.

*Mold clamping*

At the pressing station (Figures 3, 5, 6, 7 and 8) is a mold clamping means mounted on the uprights 21. This mold clamp comprises a horizontally positioned cylinder 34, piston rod 35, toggle clamp 36 and spring 37 (Figure 7). The clamping surfaces 36$^a$ of toggle are normally held in inoperative position by spring 37 operating through toggle links 36$^b$. These toggle links are pivotally connected at their outer ends to the clamps 36 and at their inner ends to an enlargement 36$^c$ formed on the piston rod 35, whereby expansion of the spring causes the ends 36$^d$ of the toggles to be drawn inwardly.

During the pressing operation the clamping mechanism holds mold sections 2 and 3 securely together (Figures 7 and 8). The clamp is rendered operative by movement of a piston 43 in cylinder 34 into its forward position by compressed air fed to the cylinder through pipe 38. Near the end of its forward movement a toggle cross head 39 engages stop 40 on toggle supporting slide 41 on uprights 21, and further forward motion of the toggle is prevented. Continued motion of rod 35 and enlargement 36$^c$ and ends 36$^d$ forces the latter outwardly. This causes the toggles to move about their pivots 36$^e$.

The piston rod 35 is retracted by piston 43 operated by compressed air admitted through a pipe 42. This motion of piston 43 and rod 35 releases the pressure on clamping surfaces 36$^a$, and further motion of the piston retracts clamping toggles out of engagement with a mold.

*Press head*

The press head, operable at the pressing station during the time a mold is clamped, is shown on the machine in Figure 3, and in detail in Figures 11 and 12. It consists of a cylinder 44, piston 45, piston rod 46, press head 47, and an auxiliary spring-actuated mold head clamp 48, guide frames 49, valve cylinder 50, timing cylinder 51 and floating valve cylinder 52. The proper timing of the actuating fluid for the press head, as for all other units of the machine, will be hereinafter described in detail. The operation of the press head is as follows:

With reference to Figures 9 to 12, inclusive, and Figure 25, actuating fluid admitted to the cylinder 44 through pipe 53 forces piston 45 downward, causing press head 47 on the lower end of piston rod 46 to engage a sleeve nut 54 on the upper end of the screw peg 32. Continued downward motion of the press head causes the screw peg 32 to be forced down into the molten glass, while mold head 4 is held securely in its position on the mold by mold head clamp 48 pressed down by springs 55. A worm 56 (Figure 10) on the screw-peg meshes with worm wheels 57. Worm 56 causes rotation of worm wheels 57 during downward motion of the screw-peg 32 under the influence of the press head. As shown in Figure 9, these worm wheels 57 are mounted on shafts 58, surrounding one end of which are springs 59, said springs bearing against friction disks 60 and nuts 61 on ends of shafts 58. At the opposite end of each shaft 58 is an enlarged head 62 which is held in frictional engagement against the worm housing by spring 59. Each of the worm wheels 57 and the friction disks 60 are keyed to the respective shafts 58.

Referring to Figure 12, a slide block 63 is mounted on the piston rod 46 and held in position by lock nuts 64. Lower on the rod 46 is threaded the press head 47. Immediately above the press head 47 is a ring 65 and lock nut 66, it being understood that mold head clamp 48 is movable with respect to slide block 63 against the force of springs 55. If it be desired to hold the press mechanism in its raised position after air has been admitted to pipe 67 and piston 45 has been raised, handle 68 may be moved inwardly, loosely pivoting about pin 69, causing slide 70 to move inwardly under ring 65 to hold the same with the other parts of the press head in their raised position. This facilitates repair or observation of the machine.

*Screw-out mechanism*

In Figures 3, 13, 14 and 15 is shown the screw-out mechanism. This mechanism comprises a main cylinder 71, piston 72, piston rod 73, rack 74, pinions 75, train of gears 76, 77, 78 and 79, bevel gears 80 and 81, screw-out rod 82, and chuck 83. The screw-out rod 82 is actuated through piston rod 84 by piston 85 and cylinder 86. The pinion and gear train are constructed as follows:

The pinion 75 is rotatably mounted on shaft 87 and keyed to gear 76, the gear 76 meshing with gear 77. The latter gear is keyed to shaft 88, to the opposite end of which gear 78 is keyed. The gear 78 meshes with gear 79, the gear 79 being keyed to shaft 87, and the bevel gear 80 being keyed to gear 79. This construction gives stepping up in mechanical motion as imparted from the rack 74 to the screw-out rod 82.

Figure 28:
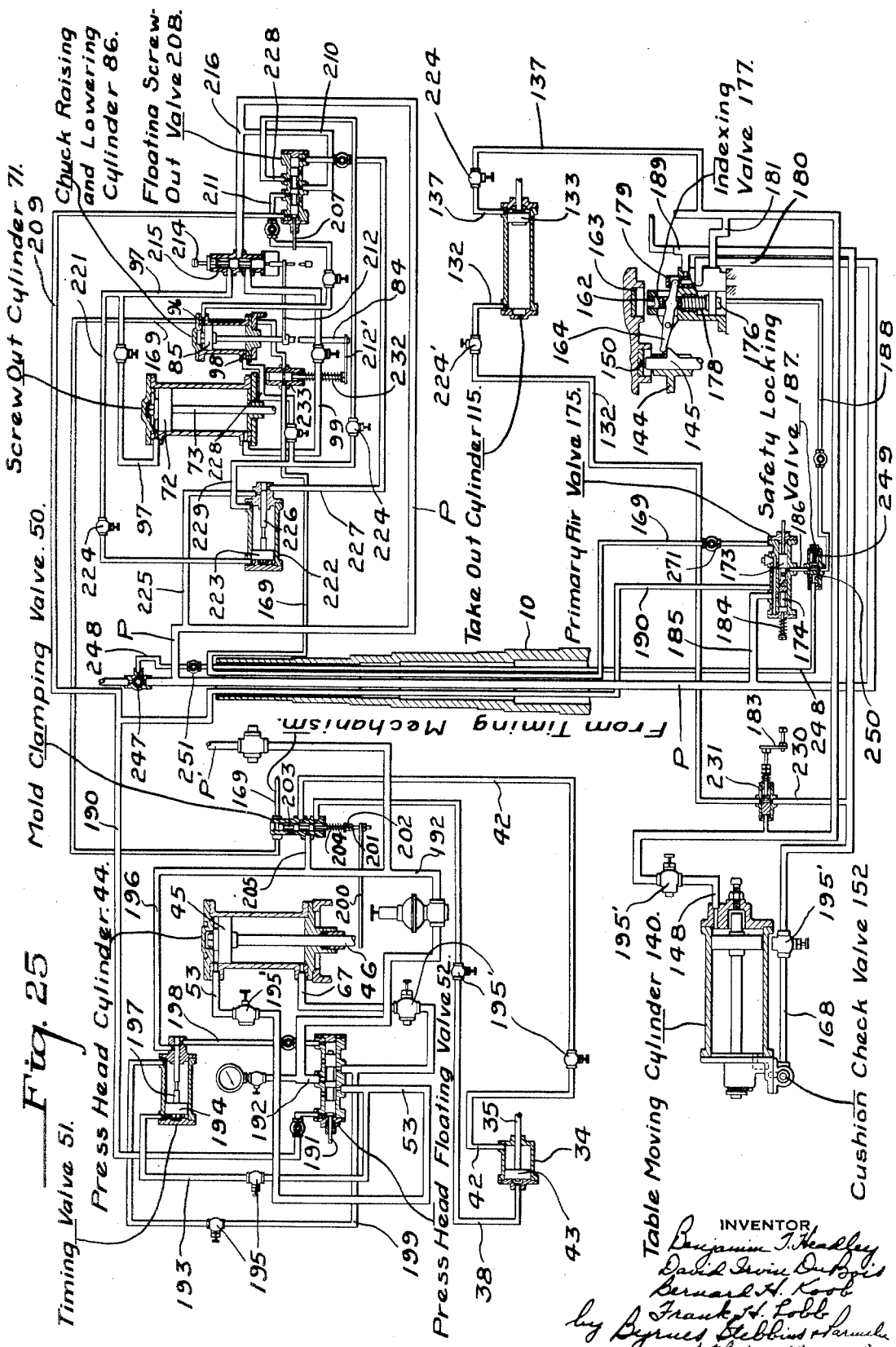
Figure 28 is a cross-section through the screw-out chuck.

The screw-out rod 82 has a threaded portion 89 at its upper end, the pitch of threads 89 being the same as the pitch of the threads on the screw peg 32. Around the threaded portion 89 is a bearing bracket 90 slidably mounted in guides 91 on connecting frame 92, the connecting frame being attached to the supports 18. Bevel gear 81 is splined to shaft 82 and has its bearing in a hub on the outer end of lower bracket 18, the bearing being of the roller bearing type. The chuck 83 (Fig. 28) comprises a generally rectangular body having a cylindrical opening in its lower portion. Projecting into this opening are fingers 93 urged inwardly by springs 94, and tending to engage in flutes 95 formed at the upper end of screw peg 32. The screw-out rod 82 is connected to the top of the chuck.

Thus the operation of the complete screw-out mechanism is as follows:

Compressed air is first admitted through a port 96 to the cylinder 86, forcing piston 85 downwardly. This causes chuck 83 on rod 82 to move down over and into engagement with the flutes 95 of the screw peg at the screw-out station. Thereafter air is admitted into pipe 97, forcing piston 72 and rack 74 downwardly. This imparts an unscrewing motion to the rod 82, threading its upper portion 89 into bracket 90. During the time of the unscrewing motion, the worm wheels 57 (Fig. 10) are held from rotating by means of the springs 59, friction disks 60 and heads 62 of shafts 58 before described. Inasmuch as the pitch of worm 56 is the same as that of the screw threads in the insulator, the screw-out peg will be withdrawn from the pressed insulator at the proper rate of motion as the peg is rotated, thereby relieving the glass of any duty with respect to effecting lifting of any of the forming parts. After this unscrewing motion, air is admitted to pipe 98, forcing the piston 85 to move chuck 83 upwardly. Then air is admitted to port 99, and piston 72 and rack 74 are moved upwardly. This latter motion of the rack rotates shaft 82 in the opposite direction to that of its unscrewing motion, thus placing it in position for the next successive operation.

*Forming or mold head operation*

Immediately after leaving the screw-cut station, the mold head starts to raise (Figure 8), being actuated by cam surface 100 on a cam plate 101, said cam plate being bolted to cam 17. A rack 103 controlling the raising and lowering of the forming head 4 is forced outwardly by roller 102 coming into engagement with cam surface 100. This rack meshes with a gear segment 104 pivotally mounted on a shaft 105 carried by the mold head supporting arm 16. Lever 106, which is an extension of the gear segment 104, is connected by link 107 to a housing 108 enclosing the worm wheels 57. As the roller 102 starts outwardly, rack 103 meshing with gear segment 104 causes the lever 106 to move the link 107 and thereby raise the worm housing 108 vertically. This motion continues until stop 109 on the worm housing comes into contact with stop 110 on the forming or mold head frame 4. During this motion a roller 111 fastened to the mold head frame extension rides on top of a cam 112 on the rack 103, preventing motion of the mold head frame. At the time stop 109 engages stop 110, cam 112 has been moved to a position such that roller 111 can roll down cam face 113, thus allowing the mold head 4 and housing 108 with screw peg assembly to swing upwardly as a unit in an arc about shaft 105.

It will be apparent that the lowering movement of the mold head, such, for example, as that which occurs during its passage from the charging station to the pressing station under the control of cam 30, is the reverse of that described. During such lowering movement, there is a bodily swinging of the mold head 4 and housing 108 with the screw-peg assembly about the axis 105 until such time as the roller 111 reaches the apex of cam 112, when further swinging movement of the mold head 4 is prevented by the said head making contact with the supporting arm 16 and the worm housing is lowered vertically into engagement with a mold.

Th reason for the true vertical motion of head 4 prior to the swinging motion thereof about pivot 105 is to retract the mold parts, including the screw peg, forming the inside of the insulator, vertically, to freely clear the pressed article before swinging them back to upper position in preparation for the taking-out of the article.

After the upward movement just described has been completed, the mold casing is opened by means of roller 22, slide 23, slide head 25, and links 26, placing the parts in position of Figure 1ᵃ ready for the take-out operation.

*Take-out mechanism*

Referring to Figures 16, 17 and 18, the take-out mechanism comprises a frame 114, cylinder 115, rack 116, intermediate gear 117, gear 118 keyed to bushing 119, gear 120 also keyed to bushing 119, and rack 121 meshing with gear 120. The gear 120 has a gear housing 122 which is rotatably mounted around bushing 119. Passing through bushing 119 and the gear housing is a shaft 123, one end of said shaft being urged away from gear cover 124 by spring 125, the other end of said shaft being fixed to a side frame 126. Fixed to the shaft 123 is a disk 127 which, through the action of spring 125, is pressed against a friction disk 128. Pivotally mounted on a boss 129 on the outside of gear housing 122 is a piston rod 130 which actuates piston 131 in dash pot 131', said dash pot being open at the bottom, the dash pot being pivotally mounted at its lower end on trunnions, as shown in Figure 16. When air is admitted to cylinder 115 through pipe 132, piston 133 (within cylinder 115) is forced outwardly, (to the right as viewed in Figure 25) moving rack 116. The motion of rack 116 is imparted to rack 121 through gears 117, 118, bushing 119 and gear 120. Rack 121 moves to the right, as shown in Figure 17, until a stop 134 thereon engages a stop 135 on the gear housing 122. Since the gear wheel 120 continues to rotate, due to the continued movement of rack 116, the gear housing 122 with its accompanying parts (including boss 129 to which the dash pot piston is connected), is rotated about shaft 123 as a pivot in the direction indicated by the arrow *a* in Figure 17.

During the forward movement of the rack 121, the fingers 136 have reached into the mold and engaged the insulator. During the rotation of the parts, the fingers 136 with the finished article are moved through an arc of approximately 180 degrees to deliver the article in inverted position onto a conveyor C, Figure 1ᵃ. The size of the complete machine and its normal speed of operation are such that by the time the article is removed it has cooled to such an extent as to be self-supporting.

The fingers are returned to their normal position by the following operations:

Air is admitted through the pipe line 137 and causes piston 133 to move in the opposite direction (to the left as viewed in Figure 25). This causes rack 116 to impart motion to rack 121 through the connections described, causing rack 121 to move to the right (Figure 18). This movement continues until stop 138 on rack 121 engages stop 139 on the gear housing 122. Continued motion of rack 116 causes gear wheel 120 to bodily rotate rack 121 and its associated parts in the direction of the arrow B about the shaft 123 as a center, thereby placing the take-out fingers in proper position for the next successive operation, as shown in Figures 4 and 17.

*Table rotating mechanism*

Referring to Figure 4, which is a section taken under ball race 12 (Figure 3), there is shown the indexing and table rotating mechanism. Certain of the parts of this mechanism are shown more in detail in Figures 19 to 23, both inclusive. The table rotating mechanism comprises a cylinder 140, rack 141, gear segment 142, arm 143, lever 144 and indexing pin 145. The rack 141 is slidably guided in rack bearing 146, the outward motion of rack 141 being limited by an adjustable stop screw 147. Rack 141 is moved outwardly relative to cylinder 140 by admitting compressed air to pipe 148, causing piston 149 to travel to the left, as viewed in Figures 4, 19 and 25. This travel of rack 141 imparts turning motion to the gear segment 142, thereby swinging arm 143, causing the lever 144 to rotate about the center column. The motion of lever 144 is imparted to the mold table 13 by the indexing pin 145 projecting into a bushing 150 on the underside of mold table 13, the indexing pin being urged upwardly into bushing 150 by a spring 151.

For cushioning the end of the table moving stroke of piston 149, there is provided valve 152, cam 153, rod 154, stop block 155 and finger 156 on the rack 141. As rack 141 (Figures 19 and 20) moves to the left, it carries with it finger 156. This finger moves with lost motion along the stop block 155 until it strikes the stop 155ᵃ, whereupon the motion of the finger is transmitted by through-rod 154 to cam 153. As cam 153 reaches a predetermined point, it allows roller 157 and valve 152 to drop, thus closing off the exhaust port from cylinder 140, thereby permitting pressure to build up within the cylinder to give the desired cushioning effect.

Hand wheel 158 in bearing 159 is provided for changing the position of this exhaust cut-off with respect to the stroke of the piston 149. Rod 154 is threaded into stop block 155 and cam 153 with right and left hand threads respectively. At the opposite end of shaft 154 there is provided a keyway 160 into which key 161 projects as a guide for the shaft. Thus, by turning hand wheel 158 in bearing 159, the shaft 154 may be rotated, moving the stop block 155 and cam 153 either closer together or farther apart as may be desired, depending upon the amount of cushioning effect wanted.

Table locking

When the mold table has been rotated to a new position by the lever 144, valves are operated, as hereinafter described, to allow lock pin 162 to engage a bushing 163 under the mold table 13. At the same time a lever 164, which is pivoted on pin 165, is moved so that the end 166 of lever 164 engages a projection 167 on the indexing pin 145, thereby retracting the indexing pin from the bushing 150. Air is then admitted to the opposite end of the table moving cylinder 140 through pipe line 168 and valve 152, moving rack 141, gear segment 142 and arm 144 back to inoperative position for a succeeding table movement. After projection 167 on pin 145 slides from under the end 166 of lever 164, the pin 145 is lifted by spring 151 and slides against the under side of the mold table 13 until reaching the next successive bushing 150.

Shear mechanism

Shown in Figure 24 is a usual type of timing mechanism for a glass shear and molding machine, the shearing operation being clearly shown in this figure. A pipe 170 connected to the back end of shear operating cylinder 171 is adapted to admit air to cause shears S to cut off a gather G. A pipe 172 admits air which retracts the piston in the cylinder 171 and brings the shear blades to their inoperative position. A pipe 169 connects to the molding machine whereby the latter is timed with respect to the shear to insure proper synchronization between the feeder F, shear S and forming machine. The shears are preferably of the well known type effective for completing a shearing operation at the center line of stream flow. Following is a more complete description of the timing mechanisms, control and piping of the machine, each main station being taken up separately.

Charging and indexing

At station 1ᵇ glass is charged into the mold through the funnel or guiding ring 5. Upon completion of the charging operation, air is admitted by the timing mechanism to pipe 169, which shifts valves 173 and 174 in valve body 175 (Figures 4, 25 and 34). Shifting of the valve 174 cuts off the flow of air from the pressure line P and its line 185, the exhaust port 175' being opened at this time (see Figure 34) for the discharge of the air previously supplied to elevate lock pin 162. Piston 176 in the valve body 177 is thereby permitted to lower, allowing the locking pin 162 to be withdrawn from the bushing 163 in the table 13, by the action of spring 178. Withdrawal of the locking pin 162 results in a lowering of an indexing valve 179 through the medium of the lever 164, allowing air from pressure line P to flow through line 180 and valve 179 to line 181. The air supplied to the line 181 causes the piston in table moving cylinder 140 to move forward, or to the left as viewed in Figure 25, carrying with it the table 13 through the action of the rack 141, gear segment 142, index arm 144, index pin 145 and bushing 150, thereby moving the table with the freshly charged mold to the pressing station 1ᶜ. At this time finger 183 on index arm 144 engages the end of primary air valve 174, compressing the spring 184 and shifting the primary air valves 173 and 174 to their former position. Shifting of the valve 174 causes air to flow from pressure line P and branch line 185 through the valve 174 to the line 186 through the safety locking valve 187 to the line 188, to force the piston 176 and locking pin 162 into the bushing 163, thereby locking the table 13 at this station. The upward movement of the locking pin 162 causes upward movement of the indexing valve 179 through the index valve lever 164. Simultaneously with the upward movement of the valve 179, the indexing pin 145 is withdrawn from the bushing 150 by the lever 164. This leaves the indexing arm 144 free to return to inoperative position, and the valve 179 is in proper position to permit air to flow from the line 180 through the valve 179, line 189 and valve 152 to the cylinder 140, causing the piston in said cylinder to return, carrying with it the indexing arm 144. The indexing arm 144 having returned to its inoperative position, the indexing pin 145 is caused to enter a bushing 150 in table 13 by the action of spring 151, preparatory to the next table movement.

Pressing

During the movement of the charged mold from the charging station to the pressing station, worm housing 108 with ring 217 is lowered into contact with the charged mold by the action of the cam 30, roller 102, rack 103 and its associated parts. When the charged mold reaches the pressing station, the mold head clamp 48, the press head 47 and associated parts are caused to descend into contact with the housing 108 and the sleeve nut 54, through the action of the piston rod 46 and piston 45 in the press head cylinder 44, causing the pressing of the glass article in the mold. The downward action of piston 45 in the cylinder 44 is accomplished in the following manner:

The forward stroke of the indexing arm 144 and finger 183 moving the primary air valve 174 against the action of the spring 184, causes air to flow from the line 185 through the primary air valve 174 and the line 190 to the floating valve casing 52, shifting the floating press head valve 191 therein and causing air to flow from a pressure line P′, branch 192, floating valve 191 and line 53 to the upper end of press head cylinder 44.

Immediately upon the return of the indexing arm 144 and the finger 183 to their inoperative position, the spring 184 causes the primary air valve 174 to shift to its inoperative position in the valve body 175, thereby cutting off pressure from the line 185 to the line 190. Air from the line 53 through its branch 193 enters the rear end of the timing valve cylinder 51, causing the timing valve 194 therein to travel forward to the right as viewed in Figure 25. The velocity with which the timing valve 194 travels in either direction in the cylinder 51 is governed by the adjustable check valves 195. When the valve 194 has reached the extreme front end of the cylinder 51, air is permitted to flow from pressure line P′ and branch line 196 through the cut-away portion of the piston rod 197 to line 198 and floating valve casing 52. This shifts the floating valve 191 and permits air to flow from the pressure line P′ and branch line 192 through the floating valve 191 to line 67 leading to the lower end of the press head cylinder 44, causing the press head 47 and its associated parts to be raised out of contact with the mold head 4. From the foregoing, it will be obvious that the pressing operation continues for a period of time dependent upon the rapidity of movement of the timing valve 194. This is adjustably controlled by the setting of check valves 195, thereby enabling the actual duration of the pressing period to be varied at the will of the operator. Air from the line 67 through its branch 199 enters the front end of the cylinder 51, causing the timing valve 194 to return to its inoperative position at a speed governed by the check valve 195 in line 199, thereby cutting off air from the line 196 to the line 198.

*Mold clamping*

When the press head 47 with its associated parts descends to effect a pressing operation, a finger 200 on slide block 63, with its adjusting screw 201, is carried with it. While the press head is in elevated position, the screw 201 is in contact with the stem 202 of a mold clamping valve 203 in cylinder 50. As the press head, and therefore the screw move downwardly, it allows the mold clamping valve 203 to be shifted by action of spring 204, permitting air from pressure line P′ and branch line 205 to flow through the mold clamping valve 203 and line 38 to rear end of the mold clamping cylinder 34. This causes the piston 43 and the associated parts of the mold clamping device to be brought into contact with the mold casing, thereby clamping the same during the pressing of the glass article. At the conclusion of the pressing operation the press head 47 is caused to ascend, bringing finger 200 with its adjusting screw 201 into contact with the valve stem 202, shifting mold clamping valve 203 in the body 50, thereby permitting air to flow from a line 205 through the mold clamping valve 203 and line 42 to the front end of the mold clamping cylinder 34, causing the mold clamping piston 43 with its associated mold clamping parts to be withdrawn to inoperative position in the manner heretofore described in detail.

Inasmuch as the duration of the pressing operation is controlled by the timing valve 194 throughout a time interval determined by the setting of the check valves 195 in the lines 193 and 199, which serve alternately as supply and exhaust lines, the operation of the mold clamping valve 203 is indirectly timed in the same manner. This is true for the reason that the mold clamping valve is operated in accordance with movements of the press head piston 45 which is directly controlled by the timing valve. By reason of this construction there is insured a machine operation in which the clamping mechanism becomes effective at the commencement of the lowering movement of the press head mechanism, and remains effective until such mechanism again reaches substantially the upper limit of its travel. The mold clamping operation, in this manner, is variably timed in accordance with the press head operation, and at all times overlaps the press head operation to prevent the passage of any glass between the mold sections while it is being subjected to pressure in the mold cavity.

The check valves 195 are preferably of the character permitting free flow of fluid under pressure in one direction while restricting the flow therethrough in the opposite direction. This is desirable since it is of advantage to have the full pressure available on one end of the piston for effecting movement thereof, the resistance to movement being controlled by the setting of the check valve. Similar check valves 195′ are shown in the lines 38 and 42 leading to the opposite ends of the mold clamping cylinder 34 and in the lines 53 and 67 leading to the opposite ends of the press head cylinder 44; and in the lines 148 and 168 leading to the opposite ends of the table moving cylinder 140. It will be apparent that the lines just described serve alternately as supply lines and exhaust lines, the construction and arrangement of the respective valves being such as to open one set of lines to exhaust during such times as fluid under pressure is being supplied to the other set. The ease of exhaust from each of these lines is controlled in accordance with the setting of the respective check valves 195'. The valve 195' in the line 168 is supplemental to the cushion check valve 152 which provides a positive cut-off operable at a predetermined time to definitely check forward travel of the table moving parts.

Screw-out operation

During the time that a charge of glass in a mold at the pressing station 1c is being subjected to the operations just described, a previously pressed charge of glass in a mold at the screw-out station 1d is being subjected to other operations. It will be apparent that at the pressing station a mold head 4 with its cooperating parts, including a screw peg 32, has been pushed into the glass charge for imparting the desired shape thereto. These parts remain in cooperative engagement with the glass during the travel of that mold from the pressing station to the screw-out station. By the time the mold with its formed article has reached the screw-out station, the glass is cooled to such an extent that it is possible to effect removal of the forming elements. In order to provide a machine of maximum capacity, this removal operation preferably occurs concomitantly with operations occurring on similar molds at other stations.

The shifting of the primary air valve 174 which was effective for supplying air under pressure to the line 190 leading to the floating press head valve 191, is also effective for delivering air from the line 190 to a branch line 209 leading, as shown in Figure 25, to the left hand end of the casing 208 of a floating screw-out valve 207. The floating screw-out valve is conveniently of a construction generally similar to the floating press head valve, suitable changes being made, however, for the particular function which it must serve. Air to the branch 209 shifts the floating screw-out valve to the right, as viewed in Figure 25, thereby permitting air under pressure to pass from the pressure line P through a branch 210 to the floating screw-out valve. At this time the line 211 is in communication with the line 210, permitting air to pass to the upper end of the chuck raising and lowering cylinder 86. This causes the piston 85 therein, together with the piston rod 84, bearing bracket 90, chuck rod 82 and chuck 83, to descend into contact with the stem of the screw peg 32 in the glass at that station. Attached to the bearing bracket 90, as indicated diagrammatically in Figure 25 and as shown in detail in Figure 14, is a trip pin 212. As the piston rod 84 nears the end of its downward stroke, the trip pin 212 engages a nut 213 connected to a screw-out valve 214 in the valve body 215. This moves the screw-out valve to its lower position, as shown in Figure 14, permitting air to flow from branch line 216 through the screw-out valve to line 97 leading to the top of screw-out cylinder 71. The piston 72, piston rod 73 and screw-out rack 74 are thereby caused to descend. Downward movement of the screw-out rack imparts rotary motion to the chuck rod 82 through the gearing 75, 76, 77, 78, 79, 80 and 81, thereby unscrewing the thread forming peg 32 from the glass.

It will be understood that when the screw peg stem 32 is rotated, the worm 56, being an integral part thereof, is likewise rotated. The action of the worm 56 and worm wheels 57, as hereinbefore described, is to raise the forming parts an amount equivalent to the pitch of the worm 56 for each revolution of the worm, it being understood that while the stem 32 is rotated, the sleeve 33 and forming parts are held against rotation by means of the worm wheel 57 and the slots 218. At the same time the forming parts are lifted by the action of the collar 219 against the ball bearing 220 and sleeve nut 54, causing a sliding action of the sleeve 33 in the housing 108, and in the mold sealing ring 217.

Air from the line 97 through its branch 221 enters the rear end of a timing cylinder 222, causing the timing valve 223 therein to move to the right, as viewed in Figure 25. The velocity with which piston 223 travels forward is governed by an adjustable check valve 224. Having arrived at the extreme end of its forward stroke, air is admitted from pressure line P and line 225 through the cutaway portion of valve rod 226 to line 227. The air pressure in line 227 is effective on the floating screw-out valve 207 for shifting the valve in the casing 208, thereby permitting air to flow from the line 210 through the valve 207 to a line 228 leading to the lower end of the chuck raising and lowering cylinder 86, causing the piston 85 and its associated parts to ascend to inoperative position. Upward movement of the nut 90 and trip pin 212 again shifts the screw-out valve 214 in the casing 215, permitting air to flow from the line 216 through the valve 214 and line 99 to the lower end of screw-out cylinder 71, causing the piston 72 and its associated parts to ascend to inoperative position. Air from the line 228 through its branch 229 enters the front end of the timing cylinder 222, causing the valve 223 therein to move to the left, as viewed in Figure 25.

The timing valve 223 functions in a manner generally similar to the timing valve 194, and controls the time of return movement of the chuck raising and lowering piston. It is effective for insuring the maintenance of the chuck in its lower position until the screw-out operation has been completed.

Take-out

During the time that the pressing and screw-out operations are occurring at the respective stations provided for that purpose, a completed article is being removed from a mold at the take-out station. It will be understood that the cam 17 is so shaped that during the travel of a mold from the screw-out position to the take-out position, the mold head assembly 4 is raised by means of the roller 102 and the associated parts in the manner described in detail. During the same travel, the mold sections 2 and 3 are opened through the medium of the cam 14 and roller 22, whereby at the take-out station the mold sections are held in open position to permit the free removal of the formed article from the mold.

The take-out is accomplished by the passage of air from the line 168, which effects the return movement of the table moving parts, and branch line 230 to a take-out valve 231, the take-out valve being operated by the finger 183 on the indexing arm 144 in such manner that as the parts return to their normal position the passage of air through the take-out valve is permitted. This air flows through line 132 to the left hand end of the take-out cylinder 115, as viewed in Figure 25, causing the piston 133 therein with its piston rod 116 to actuate the take-out fingers 136 for lifting and inverting a formed article.

At or about the time the take-out operation has been effected, the chuck raising and lowering piston 85 has completed its return travel, thereby bringing a finger 212' into engagement with the stem 232 of a resetting valve 233 and effecting an upward movement of this valve against the action of its holding spring. At this time air from the timing mechanism through the branch 169 is permitted to pass through the mold clamping valve casing 50, through the resetting valve 233 to the line 169 leading, as shown in Figure 25, to the right hand end of the primary air valve 173. This effects a movement of the primary air valve to the left and cuts off the supply of air to the line 188 and the piston 176, permitting the locking pin 162 to lower. The lowering movement of the locking pin operates the indexing valve 179, in the manner described, thereby permitting air under pressure to pass from the pressure line P to the branch 180, and through the indexing valve 179 to the line 181 and branch line 137 leading to the right hand end of the take-out cylinder 115. This causes the piston 133 and piston rod 116 to return to their normal position preparatory to a succeeding take-out operation. It will be apparent that this return movement of the take-out mechanism may occur slightly in advance of, or simultaneously with, the next movement of the table, the indexing valve 179 controlling the supply of air to the table moving cylinder.

In addition to the check valve 224 in the line 229 leading to the timing valve 223, there is a similar valve 224 in the line 221. There are also similar valves 224' in the respective lines 97 and 99 to the opposite ends of the screw-out cylinder 71, in the lines 132 and 137 to the opposite ends of the take-out cylinder 115, and in the lines 211 and 228 to the opposite ends of the chuck raising and lowering cylinder 86. These valves are similar in construction to the valves 195 and 195' before described, and serve the same general purpose. It will also be apparent that when one end of the screw-out cylinder, chuck raising and lowering cylinder and take-out cylinder is receiving air under pressure, the opposite end is exhausting air at a rate determined by the setting of the check valves.

*Take-out conveyor*

As a matter of practical expediency, it is desirable to provide a conveying mechanism for the reception of the articles removed from the molding machine in order to provide sufficient capacity to enable a number of such articles to be stored prior to their transfer to a lehr. In Figures 32 and 33 we have illustrated one form of conveying mechanism operable in accordance with the present invention. This mechanism comprises the conveyor C illustrated diagrammatically in Figure 1ᵉ. The conveyor may be carried in a frame 235 of any desired construction having sprockets 236 and 237 for cooperation therewith. For rotating at least one of the sprockets and thereby driving the conveyor, the shaft 238 carrying the sprocket 237 may have secured thereto a ratchet wheel 239, the teeth of which cooperate with a pawl 240 pivotally carried by a lever 241. The lever 241 is pivotally connected to a piston rod 242 secured to the piston 243 of the conveyor operating cylinder 244. The stroke of the piston, and consequently the angular rotation imparted to the sprocket 237 for each operation thereof, may be controlled by an adjustable stop 245. In order to permit the desired operation of the parts, the cylinder 244 may be provided with a pivotal mounting 246.

Since it is desirable to effect movement of the conveyor during such time as the mold table is being moved, we have found that the branch line 189 controlled by the indexing valve 179 may conveniently be utilized for effecting an operative stroke of the piston 243 in timed relation to the movement of the table. The return stroke of the conveyor moving piston may be accomplished by air under pressure from the line 181, also controlled by the indexing valve, whereby the return stroke of the conveyor moving mechanism occurs substantially simultaneously with the return stroke of the table moving mechanism.

Safety

With the construction described, it will be apparent that if for any reason it became necessary to cut off air from the machine, the locking pin 162 would be automatically withdrawn from the bushing 163 in the table 13 by the action of the spring 178. In order to prevent such an operation, the pressure line P is provided with a three-way valve 247 effective for establishing communication between the source of pressure and the lines P, or establishing pressure between the source and a branch line 248. When the valve 247 is operated to cut off air from the lines P, air is caused to flow from the source of supply through the valve 247 to line 248. The air flowing through this line passes to the left hand end of the safety locking valve 187, causing it to be shifted against the action of a spring 249, thereby opening the port 250 and permitting air to flow through the line 188 from the line 248. This air is effective against the bottom of piston 176 for holding the locking pin in engagement with a bushing 163 in the table. In order to permit manual rotation of the parts, should such an operation be desirable, the line 248 is provided with a cut-off valve 251 whereby free table movement is made possible.

Modified screw-out

Figure 29:
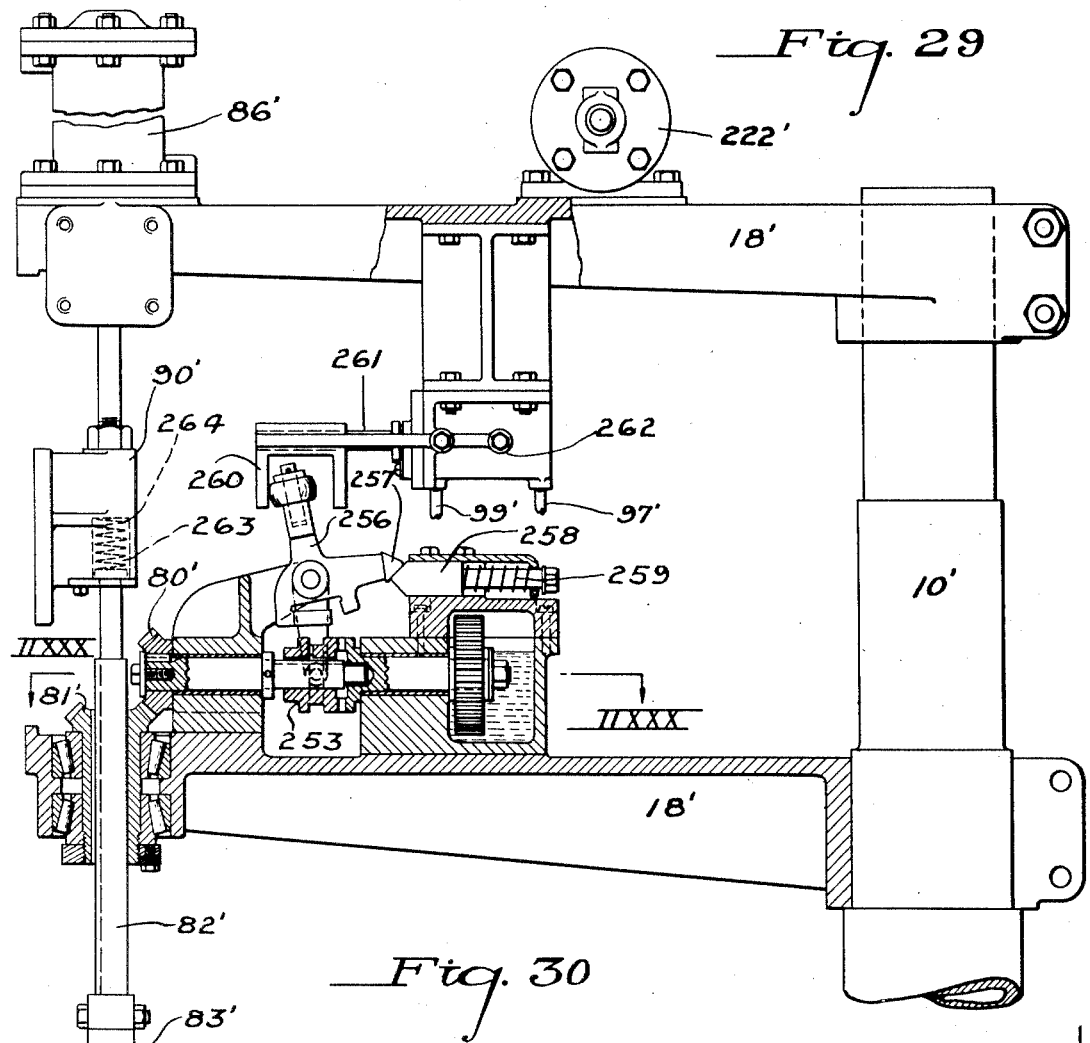
Figure 30:
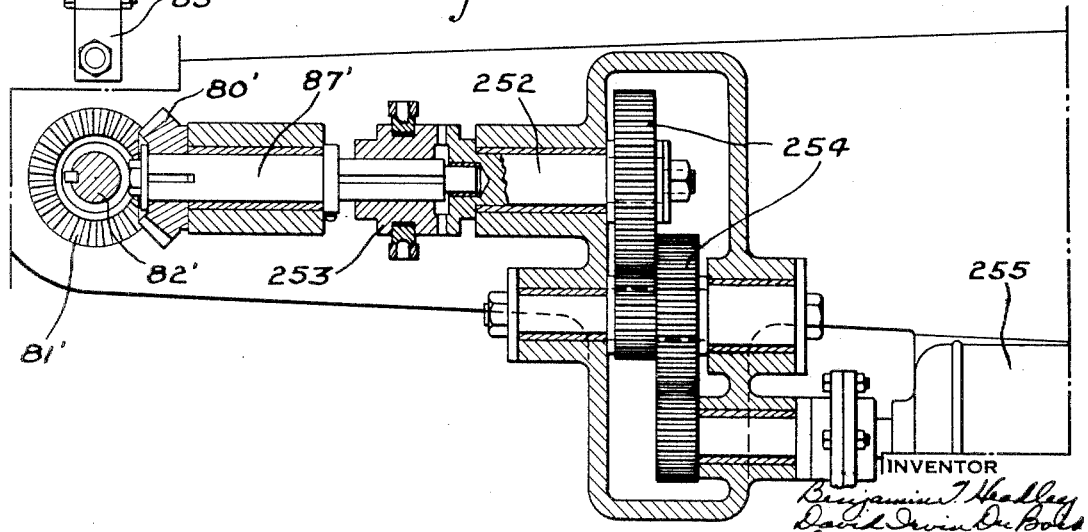

In Figures 29, 30 and 31, there is illustrated a modified form of screw-out mechanism which may be used in accordance with our invention, the parts of this mechanism corresponding to parts heretofore described being designated by the same reference characters having a prime affixed thereto. The screw-out chuck 83' is adapted to be raised and lowered in the manner described by a chuck raising and lowering cylinder 86'. Splined to the chuck rod 82' is a bevel gear 81' meshing with a similar gear 80' on shaft 87'. This shaft may be operatively connected to or disconnected from a driving shaft 252 by means of a clutch 253. The driving shaft 252 is driven through a gear train 254 from a continuously operating motor 255, rotation being imparted to the chuck 83' when the clutch 253 is operated to effect engagement between the shafts 87' and 252.

In order to provide for a quick action of the clutch, there is utilized a clutch operating lever 256 having a wedge-shaped nose 257 cooperating with a similarly shaped pawl 258. This pawl is normally urged into the position illustrated in Figure 29 by a spring 259. Cooperating with the throw-out lever 256 is a yoke 260 on a piston rod 261 connected in any desired manner to a piston (not shown) in clutch operating cylinder 262. Inasmuch as the continuously operating motor 255 replaces the intermittently operable screw-out cylinder mechanism, before described as comprising a screw-out cylinder 71, it will be apparent that the clutch operating cylinder 262 may be considered as the equivalent of the screw-out cylinder 71, it being operative for engaging the clutch 253 when the chuck 83' is in lower position, and for disengaging the clutch after a screw-out operation has been completed. For this reason, the line 97' supplying fluid for energizing the clutch may be connected as is the line 97 of Figure 25, and the line 99' connected as is the line 99 of Figure 25.

Inasmuch as the chuck rod 82' is intermittently operated at all times in the same direction, it is not possible to provide a threaded connection 89 therefor as illustrated in Figure 14. The bracket 90' may, however, be provided with a recess 263 in which the head of the chuck rod may slide freely against the action of gravity or against the action of a light spring 264.

In order to prevent continued operation of the screw-out motor 255 during such times as the air is off the machine, there may be provided a motor circuit of the character indicated diagrammatically in Figure 31, in which the leads 265 to the motor are provided with a manually operated switch 266 and with a pressure operated switch 267. The pressure operated switch is normally urged into the position shown in Figure 31 by a spring 268. It is moved in the opposite direction against the action of the spring by fluid under pressure admitted through a line 269. The line 269 may be connected in any desired manner to any source of fluid under pressure, such, for example, as the line P or one of its branches. With such a connection, if the air pressure fails or is cut off for any purpose, the motor will be automatically thrown out of operation.

From the foregoing it will be apparent that the present invention provides a glass working machine comprising a plurality of molds and a plurality of forming elements movable relatively thereto and operable automatically during the operation of the machine. Once the machine is set into operation it is controlled automatically by the various valves and timing mechanism provided. Certain advantages result from the use of a timing valve for controlling the operation of the press head mechanism, and particularly from the use of a timing valve which is adjustable to vary the duration of the pressing operation.

Cushioning for air operated valves

We have found that valves of the air operated type, unless provided with some means for checking or controlling their speed of movement, do not always remain in the extreme position to which they may have been moved. Where the movement is too rapid, the valves tend to rebound, thereby interfering with the required control of the air. To obviate this, we provide the press head floating valve 52, the floating screw out valve 208, and one side of the primary air valve 174 with check or control valves 271, whereby the actual speed of movement of the valves may be so controlled as to prevent any rebound.

Other advantages result from the provision of a timing means for the mechanism including the chuck raising and lowering cylinder and screw-out means.

Other advantages result from the use of timing means of the character referred to in combination with a main timing mechanism by means of which an inter-control of the feeder and forming machine may be obtained to prevent operation of the latter until a charge of glass has been supplied by the former.

Still other advantages arise from the construction of the forming element by means of which a quick lowering of the plunger into contact with the glass is effected to prevent chilling, and by means of which a straight pressure may be applied to the plunger for forcing it into position and a rotary motion imparted for effecting withdrawal thereof.

Still further advantages are inherent in the construction and relationship of the various parts in combination with the control means provided therefor, including the means for obtaining a true vertical movement of the forming plunger during its withdrawal from a charge of glass, the frictionally held screw-out mechanism determining the speed of elevation of the forming plunger; the variable cut-off for the table moving or indexing cylinder; the safety devices provided; and the control and construction of the locking means whereby the parts may be held in predetermined position when the air pressure is cut off from the machine.

It will be apparent to those skilled in the art that many changes in the construction, location and arrangement of the parts and in the manner of controlling the same, may be effected without changing or departing from the inventive concept herein disclosed.

We claim:

1. In a forming machine, a mold, a forming plunger, a chuck for engagement with said plunger, rotating mechanism for said chuck, mechanism for advancing and retracting said chuck, means actuated as the result of the advancement of said chuck to effect operation of said chuck rotating mechanism, and timing mechanism controlling the retraction of said chuck.

2. In a forming machine, a mold, a forming plunger, a chuck for engagement with said plunger, rotating mechanism for said chuck, mechanism for advancing and retracting said chuck, means actuated as the result of the advancement of said chuck to effect operation of said chuck rotating mechanism, and timing mechanism controlling the retraction of said chuck, said means being operative during retraction of said chuck to effect a return operation of said chuck rotating mechanism.

3. In a forming machine, a movable mold carrier, a plurality of molds carried thereby, a swinging mold head cooperating with each mold, a press mechanism common to all of said heads, timing means for said press mechanism, a screw-out mechanism common to all of said heads, a timing means for said screw-out mechanism, and carrier moving means operative for advancing said carrier in timed relation to the operation of said press mechanism and said screw-out mechanism.

4. In a forming machine, a plurality of molds movable successively to a charging station, a pressing station, a screw-out station and a take-out station, means for effecting movement of said molds, a swinging mold head cooperating with each mold, a screw-peg carried by each of said heads, means for effecting a substantially straight line movement of said pegs into their respective molds, and means for rotating said pegs to effect retraction from said molds.

5. In a forming machine, a mold, a swinging mold head cooperating therewith, a forming plunger in said head, and means for swinging said head into and out of operative relation to said mold, said means insuring a predetermined substantially rectilinear movement of said plunger in a direction angularly disposed relative to the axis of swinging movement of said mold head prior to swinging movement of said head out of operative relation with said mold.

6. In a forming machine, a mold, a swinging mold head cooperating therewith, a forming plunger carried by said head and provided with a threaded screw-out portion, and frictionally held means cooperating with said threaded portion.

7. In a glass working machine, a mold head comprising a screw-out peg having a threaded screw-out portion, a frictionally held thread cooperating with said threaded portion to permit predetermined axial movement of said peg without rotation thereof, and a mounting for said head.

8. In a glass working machine, a mold, a mold head cooperating therewith, said mold and mold head being relatively movable, a screw-out peg mounted in said head and provided with a threaded screw-out portion, and a frictionally held nut carried by said head and cooperating with said threaded portion.

9. In a glass working machine, a mold, a mold head cooperating therewith, said mold and mold head being relatively movable, a screw-out peg mounted in said head and provided with a threaded screw-out portion, and a frictionally held nut carried by said head and cooperating with said threaded portion, said nut comprising a worm wheel rotatable to permit axial movement of said peg without rotation thereof in one direction.

10. In a glass working machine, a mold, a mold head cooperating therewith and movable about a horizontal axis, a forming plunger in said head, and mold head raising and swinging mechanism for effecting a predetermined vertical movement of said plunger prior to movement of said head about said axis.

11. In a glass working machine, a movable mold carrier, a plurality of molds thereon, a swinging mold head coperating with each of said molds, and means for supporting and moving said mold heads relative to said molds, said mold head supporting and moving means being effective for insuring a substantially rectilinear raising movement of each head throughout a predetermined distance and a swinging movement thereof about an axis angularly disposed with respect to the direction of rectilinear raising movement thereof.

12. In a glass working machine, a movable mold carrier, a plurality of molds thereon, a separate mold head movably cooperating with each mold, a forming plunger mounted in and carried by each mold head, a press mechanism common to all of said molds for effecting substantially non-rotary movement of said plungers successively into the mold cavities of their respective molds, and a screw-out mechanism comon to all of said molds for effecting a screw-out movement of said plungers relatively to said heads.

13. In a forming machine, a mold, a mold head movably cooperating therewith, a pair of frictionally mounted worm wheels carried by said head, a screw-out peg in said head intermediate said worm wheels and having a threaded portion cooperating therewith, and means cooperating with said peg to move the same in one direction and effect rotation of said worms and thereafter rotate the same between said worms.

14. In a glass working machine, a movable mold carrier, a plurality of molds thereon, a head movably cooperating with each of said molds, each head comprising a glass forming portion, said heads being movable about horizontal axes, and a cam for controlling the movement of said heads about said axes, said cam having an abrupt portion insuring a rapid drop of said heads adjacent the completion of their downward movement.

15. A take-out mechanism for forming machines, comprising a reciprocable and rotatable article-engaging device, actuating mechanism for reciprocating and rotating said device, gearing intermediate said device and actuating mechanism, and friction means cooperating with said gearing to insure reciprocation of said article-engaging device prior to the rotation thereof.

16. In a glass working machine, a mold carrier, fluid pressure operating means therefor, forming elements, fluid pressure press mechanism cooperating therewith, fluid pressure screw-out mechanism cooperating therewith, a primary air valve, a timing valve for said press mechanism, a timing valve for said screw-out mechanism, connections between said primary valve and said timing valves, and resetting means for said primary valve controlled by one of said mechanisms.

17. In a glass working machine, a mold forming mechanism cooperating with the mold, a revoluble plunger cooperating with said forming mechanism, means for revolving said plunger and friction held means for insuring vertical movement of the forming mechanism during the rotation of the plunger.

18. In a glass working machine, a movable carrier, molds thereon, press head mechanism cooperating with said molds, screw-out mechanism cooperating with said molds, and means for controlling the movement of said carrier by both said press head mechanism and said screw-out mechanism.

19. In a glass-working machine, a mold, a member for cooperating with said mold to form plastic material contained in the mold, said member being movable to and from cooperating position, clamping means for said mold, and means engageable by said forming member upon movement from cooperating position for automatically releasing said clamping means.

20. In a glass-working machine, a press mold, a reciprocable plunger for cooperating with said mold to form plastic material contained therein, clamping means for said press mold, and means engageable by said plunger upon movement thereof away from the mold for automatically releasing said clamping means.

21. In a forming machine, a mold, a forming plunger, rotating mechanism for the plunger including actuating means and means for operatively connecting the actuating means to rotate the plunger and for disconnecting the same, and timing means for the actuating means controlled by the connecting means.

22. In a forming machine, a mold, a forming plunger, rotating mechanism for the plunger including actuating means and means movable into one position for operatively connecting the actuating means to rotate the plunger and into another position for disconnecting said actuating means therefrom, and timing means controlled by said movements of the connecting means for timing the actuating means.

23. In a forming machine, an intermittently movable mold carrier, a plurality of molds thereon, a forming plunger for each mold, rotating mechanism for said plungers normally disengaged therefrom, means producing cooperative engagement between said mechanism and the plunger, timing mechanism operated by said means for maintaining the same in coperative engagement until rotation of said plunger is completed and thereafter discontinuing such cooperative engagement therebetween, and means for effecting movement of said mold carrier subsequent to the rotation of each plunger.

In testimony whereof we have hereunto set our hands.

BENJAMIN T. HEADLEY.
DAVID IRVIN DU BOIS.
BERNARD H. KOOB.
FRANK H. LOBB.